US011106904B2

(12) United States Patent
Yonetani et al.

(10) Patent No.: US 11,106,904 B2
(45) Date of Patent: Aug. 31, 2021

(54) METHODS AND SYSTEMS FOR FORECASTING CROWD DYNAMICS

(71) Applicant: Omron Corporation, Kyoto (JP)

(72) Inventors: Ryo Yonetani, Tokyo (JP); Mai Kurose, Tokyo (JP)

(73) Assignee: Omron Corporation, Kyoto (JP)

( * ) Notice: Subject to any disclaimer, the term of this patent is extended or adjusted under 35 U.S.C. 154(b) by 69 days.

(21) Appl. No.: 16/690,066

(22) Filed: Nov. 20, 2019

(65) Prior Publication Data
US 2021/0150196 A1 May 20, 2021

(51) Int. Cl.
*G06K 9/00* (2006.01)
*G06T 7/194* (2017.01)
*G06T 7/20* (2017.01)
*G06T 7/73* (2017.01)

(52) U.S. Cl.
CPC ...... *G06K 9/00369* (2013.01); *G06K 9/00711* (2013.01); *G06T 7/194* (2017.01); *G06T 7/20* (2013.01); *G06T 7/75* (2017.01); *G06T 2207/10016* (2013.01)

(58) Field of Classification Search
CPC .. G06K 9/00369; G06K 9/00711; G06T 7/75; G06T 7/194; G06T 7/20; G06T 2207/1001
See application file for complete search history.

(56) References Cited

U.S. PATENT DOCUMENTS

| 7,139,409 B2 * | 11/2006 | Paragios | G06K 9/00778 382/103 |
| 2010/0322516 A1 * | 12/2010 | Xu | G06K 9/00778 382/173 |
| 2014/0072170 A1 * | 3/2014 | Zhang | G06K 9/00369 382/103 |
| 2016/0358341 A1 * | 12/2016 | Li | G06T 7/90 |

(Continued)

FOREIGN PATENT DOCUMENTS

| CN | 103218816 | * | 7/2013 | ............... G06T 5/00 |
| CN | 109389044 | * | 2/2019 | ......... G06K 9/00718 |
| WO | WO2016183766 | * | 11/2016 | ......... G06K 9/00778 |

OTHER PUBLICATIONS

Yuke Li, "a Deep Spatiotemporal Perspective for Understanding Crowd Behavior", IEEE Transactions on multimedia, vol. 20. No. 12, Dec. 2018, pp. 3289-3297 (Year: 2018).*

*Primary Examiner* — Amara Abdi
(74) *Attorney, Agent, or Firm* — Morgan, Lewis & Bockius LLP

(57) ABSTRACT

A method for modeling crowd movement includes obtaining a temporal sequence of images of a physical venue and, for each of the images, subdividing the respective image into a respective set of logical pixels according to a predetermined mapping. For each logical pixel of each image, the method computes a respective crowd density representing a respective number of mobile objects per unit of area in the physical venue at the logical pixel, thereby forming a temporal sequence of crowd density maps that corresponds to the (Continued)

temporal sequence of images. The method then uses successive pairs of crowd density maps to train a model on spatiotemporal changes in crowd density at the physical venue. A method of predicting future crowd density maps at physical venues using a current image of the physical venue and the trained model is also disclosed.

20 Claims, 20 Drawing Sheets

(56) References Cited

U.S. PATENT DOCUMENTS

| | | | |
|---|---|---|---|
| 2017/0185867 A1* | 6/2017 | Lee | G06T 11/206 |
| 2017/0187998 A1* | 6/2017 | Xiao | H04N 9/3141 |
| 2018/0197017 A1* | 7/2018 | Mansour | G06K 9/6232 |
| 2020/0008002 A1* | 1/2020 | Sahay | G06K 9/00624 |
| 2020/0387718 A1* | 12/2020 | Chan | G06K 9/6857 |

* cited by examiner

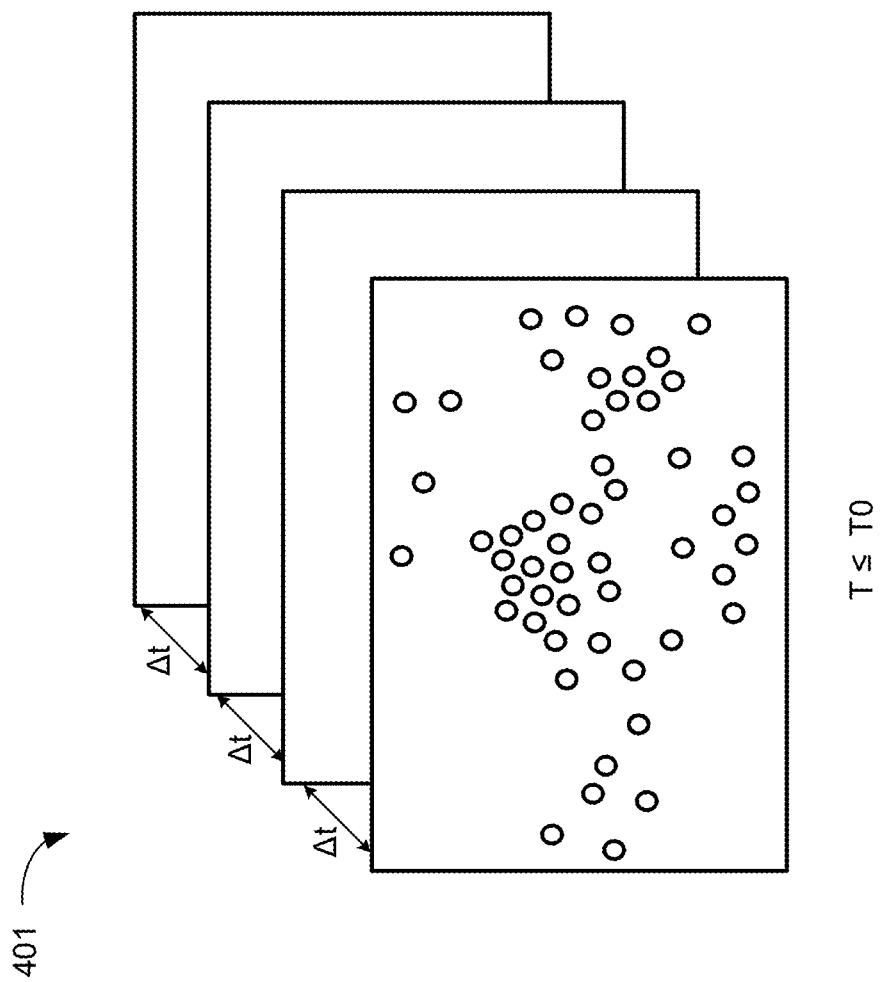

600

610 Obtain a temporal sequence of images of a physical venue.

| 612 The physical venue is a portion of a park, an airport, a train station, an arena, a shopping mall, a factory, a home, a body of water, the sky, or a street corner.

| 614 A time delta between successive images in the temporal sequence is a value $\Delta t$ that is between one millisecond and one week.

620 For each of the images, subdivide the respective image into a respective set of logical pixels according to a predetermined mapping.

| 622 Each logical pixel corresponds to a respective single physical pixel in the images.

| 624 Each logical pixel corresponds to a respective plurality of physical pixels in the images.

630 For each logical pixel of each image, compute a respective crowd density representing a respective number of mobile objects per unit of area in the physical venue at the logical pixel, thereby forming a temporal sequence of crowd density maps to train a model on spatiotemporal changes in crowd density at the physical venue.

| 632 The mobile objects are selected from the group consisting of: people, non-humans, motorized vehicles, non-motorized vehicles, airplanes, drones, and mobile robots.

| 634 Computing the crowd density at each logical pixel includes convolving each of the images with one or more Gaussian maps.

| 636 Computing the crowd density at each logical pixel includes down-sampling.

640 Use successive pairs of crowd density maps to train a model on spatiotemporal changes in crowd density at the physical venue.

650 Obtain additional information associated with each of the images and use the additional information to train the model.

652 The additional information includes one or more of: (i) a timestamp for each of the images, (ii) one or more weather parameters associated with each of the images, (iii) a day-of week indication for each of the images, (iv) scene context annotations for each logical pixel in each of the images, (v) scene context annotations for each of the images, (vi) range information, and (vii) thermal information.

710 Obtain a trained model of crowd movement for a physical venue. The trained model is trained according to a temporal sequence of images of the physical venue.

712 The physical venue is a portion of a park, an airport, a train station, an arena, a shopping mall, a factory, a home, a body of water, the sky, or a street corner.

714 A time delta between successive images in the temporal sequence is a value $\Delta t$ that is between one millisecond and one week.

---

720 Obtain a current image of the physical venue.

---

730 Subdivide the current image into a set of logical pixels according to a predetermined mapping used during the training of the model.

732 Each logical pixel corresponds to a respective single physical pixel in the images.

734 Each logical pixel corresponds to a respective plurality of physical pixels in the images.

METHODS AND SYSTEMS FOR FORECASTING CROWD DYNAMICS

TECHNICAL FIELD

The disclosed implementations relate generally to crowd dynamics and more specifically to systems and methods for predicting crowd density behavior.

BACKGROUND

Forecasting crowd behavior can be useful many assistive technologies, such as in collision avoidance, driver assistance, and guiding visually impaired persons, to name a few. Currently available techniques for forecasting crowd behavior usually involves identifying and tracking exact locations of individuals. However, this poses a concern for privacy tracking an individual's exact location or trajectory may be used to reveal the individual's identity and/or the individual's personal and private information. Thus, currently technologies fail to protect individual's private information and locations when forecasting crowd behavior.

SUMMARY

To effectively forecast crowd behavior it is important to detect and map movements and changes in the field of view in order to understand and correctly predict crowd behavior. However, existing techniques require tracking individual's trajectory and/or exact locations, which may lead to a myriad of privacy concerns.

Accordingly, there is a need for tools that can forecast crowd behavior while protecting the privacy and personal information of each individual in the crowd. There is also a need for tools that employ such predictions to allow systems to effectively guide or assist their users in navigating crowd. One solution to the problem is visualizing the crowd as a density map instead of tracking each individual person in the crowd. The density map allows the technique to visualize the movements and changes in crowd density over time and while lending anonymity to individuals in the crowd. Thus, the identity-agnostic aspect of this technique allows the results to be generalized (e.g., not specific to certain individual's and their particular behaviors) while protecting individual's privacy.

In accordance with some implementations, a method for modeling crowd movement at physical venues executes at an electronic device with a display, one or more processors, and memory. For example, the electronic device can be a smart phone, a tablet, a notebook computer, or a desktop computer. The device obtains a temporal sequence of images of a physical venue. For each of the images, the device subdivides the respective image into a respective set of logical pixels according to a predetermined mapping. For each logical pixel of each image, the device computes a respective crowd density that represents a respective number of mobile objects per unit of area in the physical venue at the logical pixel, thereby forming a temporal sequence of crowd density maps that correspond to the temporal sequence of images. The device then uses successive pairs of crowd density maps to train a model on spatiotemporal changes in crowd density at the physical venue.

In some instances, a time delta (e.g., time difference) between successive images in the temporal sequence is consistent across the images (e.g., 100 milliseconds between successive images). In other instances, the time deltas are different depending on the pair of successive images (e.g., 50 milliseconds between a first pair of successive images and 125 milliseconds between a second pair of successive images). Some implementations use interpolation to generate a set of images with consistent time deltas when the images are not captured at fixed intervals.

In some instances, the mobile objects are people. In some instances, the mobile objects are non-human animals. In some instances, the mobile objects are motorized vehicles, such as cars, or non-motorized vehicles, such as bicycles. In some instances, the mobile objects are airplanes or drones. In some instances, the mobile objects are mobile robots. In general, the mobile objects can be any objects that are capable of autonomous movement. In some instances, the mobile objects are all of the same type (e.g., all of mobile objects are people). In other instances, the mobile objects have two or more different types (e.g., pedestrians and people on bicycles).

In some implementations, the physical venue is a portion of a park, an airport, a train station, an arena, a shopping mall, a factory, a home, a body of water, the sky, or a street corner. The physical venue can be any indoor or outdoor physical venue where there are many autonomous mobile objects.

In some implementations, each logical pixel corresponds to a respective single physical pixel in the images.

In some implementations, each logical pixel corresponds to a respective plurality of physical pixels in the images.

In some implementations, further includes obtaining additional information associated with each of the images and using the additional information to train the model.

In some implementations, the additional information includes one or more of: (i) a timestamp for each of the images, (ii) one or more weather parameters associated with each of the images, (iii) a day-of-week indicator for each of the images, and (iv) scene context annotations for each logical pixel in each of the images; (v) scene context annotations for each of the images (e.g., "home," "indoor," "outdoor," "park," or "amusement park"); (vi) range information; and (vii) thermal information.

In some implementations, computing the crowd density at each logical pixel comprises convolving each of the each of the images with one or more Gaussian maps.

In some implementations, computing the crowd density at each logical pixel comprises down-sampling.

In some implementations, the time deltas (e.g., a time difference between successive images in the sequence of images) are values between one millisecond and one week. The relevant time delta depends on the type of mobile objects and the speeds of those objects. As noted above, some implementations use consistent time deltas, whereas other implementations have varied time deltas depending on which pair of successive images is selected.

In some implementations, training the model comprises: categorizing each of the successive pairs as easy, medium, or difficult, initially training the model using successive pairs that are categorized as easy, continuing training the model using successive pairs that are categorized as medium, and completing training the model using successive pairs that are categorized as difficult.

In some implementations, the trained model provides predictions of spatiotemporal changes in crowd density according to input images and requested time offsets from the input images.

In some implementations, providing the predictions of spatiotemporal changes in crowd density uses scene information. For example, the scene information may include scene type and/or weather conditions.

In some implementations, the trained model also provides accuracy estimates for the provided predictions.

In some implementations, the temporal sequence of images comprises a plurality of temporal subsequences, wherein each of the successive pairs of crowd density maps used to train the model comprises a respective pair of crowd density maps within a single respective temporal subsequence.

The temporal sequence of images are captured by a wide variety of cameras and devices that are able to capture images. For example, the images may be captured by one or more of: (i) a static surveillance camera, (ii) a PTZ (Pan/Tilt/Zoom) surveillance camera, (iii) a digital camera, (iv) an image sensor of a smartphone, (v) a drone camera, (vi) a vehicle mounted camera, or (vii) a rangefinder camera.

In accordance with some embodiments, a method of predicting future crowd density maps at physical venues executes at an electronic device with a display, one or more processors, and memory. For example, the electronic device can be a smart phone, a tablet, a notebook computer, or a desktop computer. The device obtains a trained model of crowd movement for a physical venue. The model is trained according to a temporal sequence of images of the physical venue. The device obtains a current image of the physical venue and subdivides the current image into a set of logical pixels according to a predetermined mapping used during the training of the model. For each logical pixel, the device computes a respective crowd density representing a respective number of mobile objects per unit of area in the physical venue at the logical pixel, thereby forming a crowd density map corresponding to the current image. The device then receives a specified future time offset from a time corresponding to the current image and applies the trained model to the current crowd density map and the specified future time offset to predict a crowd density map at the physical venue at the specified future time offset.

In some instances, a time delta (e.g., time difference) between successive images in the temporal sequence is consistent across the images (e.g., 200 milliseconds between successive images). In other instances, the time deltas are different depending on the pair of successive images (e.g., 25 milliseconds between a first pair of successive images and 200 milliseconds between a second pair of successive images). Some implementations use interpolation to generate a set of images with consistent time deltas when the images are not captured at fixed intervals.

In some instances, the mobile objects are people. In some instances, the mobile objects are non-human animals. In some instances, the mobile objects are motorized vehicles, such as cars, or non-motorized vehicles, such as bicycles. In some instances, the mobile objects are airplanes or drones. In some instances, the mobile objects are mobile robots. In general, the mobile objects can be any objects that are capable of autonomous movement. In some instances, the mobile objects are all of the same type (e.g., all of mobile objects are people). In other instances, the mobile objects have two or more different types (e.g., pedestrians and people on bicycles).

In some implementations, the physical venue is a portion of a park, an airport, a train station, an arena, a shopping mall, a factory, a home, a body of water, the sky, or a street corner. The physical venue can be any indoor or outdoor physical venue where there are many autonomous mobile objects.

In some implementations, each logical pixel corresponds to a respective single physical pixel in the images.

In some implementations, each logical pixel corresponds to a respective plurality of physical pixels in the images.

In some implementations, the additional information includes one or more of: (i) a timestamp for the current image, (ii) one or more weather parameters associated with the current image, (iii) a day-of-week indicator for the current image, (iv) scene context annotations for each logical pixel in the current image, (v) scene context annotations for the current image (e.g., "home," "indoor," "outdoor," "park," or "amusement park"), (vi) range information for the current image, and (vii) thermal information for the current image.

In some implementations, computing the crowd density at each logical pixel comprises convolving the current image with one or more Gaussian maps.

In some implementations, computing the crowd density at each logical pixel comprises down-sampling.

In some implementations, the time deltas (e.g., a time difference between successive images in the sequence of images) are between one millisecond and one week.

In some implementations, applying the trained model to the current crowd density map includes expressing the specified future time offset as an integer multiple N of $\Delta t$, and the device applies the trained model N times sequentially, starting with the current crowd density map.

In some implementations, applying the trained model provides a prediction of spatiotemporal changes in crowd density according to the current image and the specified future time offset.

In some implementations, providing the predictions of spatiotemporal changes in crowd density further includes providing predictions according to scene information, including scene type and/or weather conditions.

In some implementations, applying the trained model also provides an accuracy estimate for the provided prediction.

The temporal sequence of images are captured by a wide variety of cameras and devices that are able to capture images. For example, the images may be captured by one or more of: (i) a static surveillance camera, (ii) a PTZ (Pan/Tilt/Zoom) surveillance camera, (iii) a digital camera, (iv) an image sensor of a smartphone, (v) a drone camera, (vi) a vehicle mounted camera, or (vii) a rangefinder camera.

Typically, an electronic device includes one or more processors, memory, a display, and one or more programs stored in the memory. The programs are configured for execution by the one or more processors and are configured to perform any of the methods described herein.

In some implementations, a non-transitory computer readable storage medium stores one or more programs configured for execution by a computing device having one or more processors, memory, and a display. The one or more programs are configured to perform any of the methods described herein.

Thus methods and systems are disclosed that provide crowd dynamic forecasting while maintain individual person's privacy and anonymity in a crowd.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 4D-4E illustrate examples of temporal sequences of images used in training a dynamics model according to some implementations.

FIGS. 6A-6C provide a flow diagram of a method for modeling crowd movement according to some implementations.

FIGS. 7A-7C provide a flow diagram of a method for predicting future crowd density maps according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
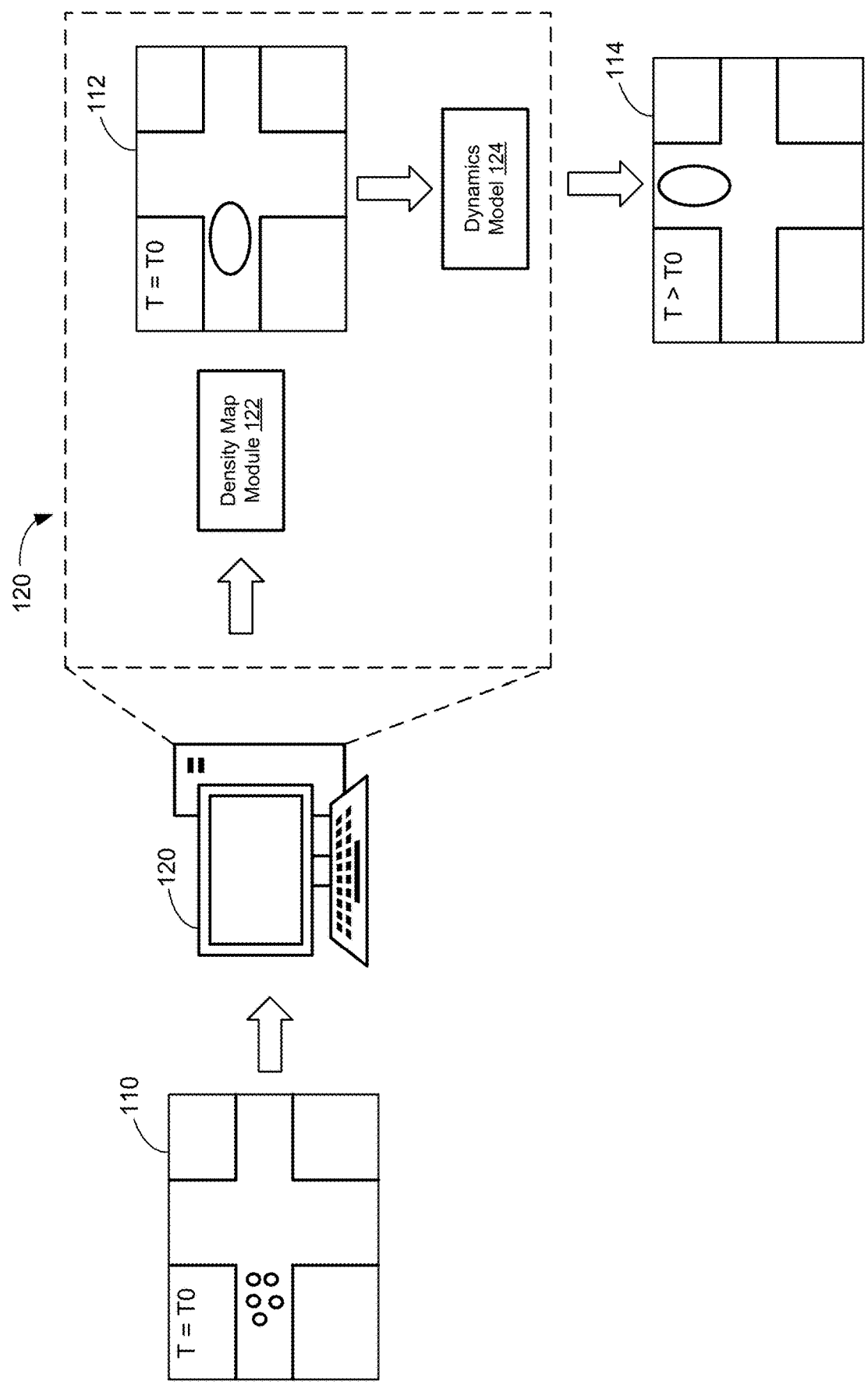
FIG. 1 illustrates crowd dynamic forecasting, in accordance with some implementations.

FIG. 1 illustrates generating a crowd density map forecast using a current image 110 (e.g., an image taken at a present time, T=T0) of a physical venue. The physical venue may be a public area, such as a park, an intersection, a street corner, or a portion of an airport, train station, or shopping mall. The current image 110 may be taken using a camera and may be a captured picture or a frame from a video (e.g., for example, a security video surveillance) of the physical venue. A computer system 120 receives the current image 110 and, using a density map module 122, transforms the current image 110 into a crowd density map 112 that represents a crowd density of the physical venue as shown in the current image 110. The process of translating an image into a crowd density map is described below with respect to FIGS. 3A-3C, where each logical pixel in the crowd density map corresponds to (e.g., is mapped to) one or more pixels in the image. Thus, the crowd density map is a representation of the number of individuals per unit area. After the current image 110 is transformed into a crowd density map 112, a dynamics model 124 uses information from the crowd density map 112 and provides a predictive crowd density map 114 for a future time, T>T0. In order to provide accurate predictions, the dynamics model 124 needs to be trained. The training process of the dynamics model 124, described below with respect to FIGS. 4B and 4C, includes providing the dynamics model 124 with a temporal sequence of crowd density maps (that are derived from images) so that the dynamics model 124 can learn temporal changes in crowd density and crowd behavior. The process of generating predictive crowd density map(s) 114 is described below with respect to FIG. 5A and FIG. 5B provides a detailed example of a predictive crowd density map(s) 114.

By converting captured images into crowd density maps, this system and method allows the dynamics model 124 to learn and forecast crowd behavior without identifying and tracking individual's movements, thereby protecting their personal information and privacy.

Figure 2:
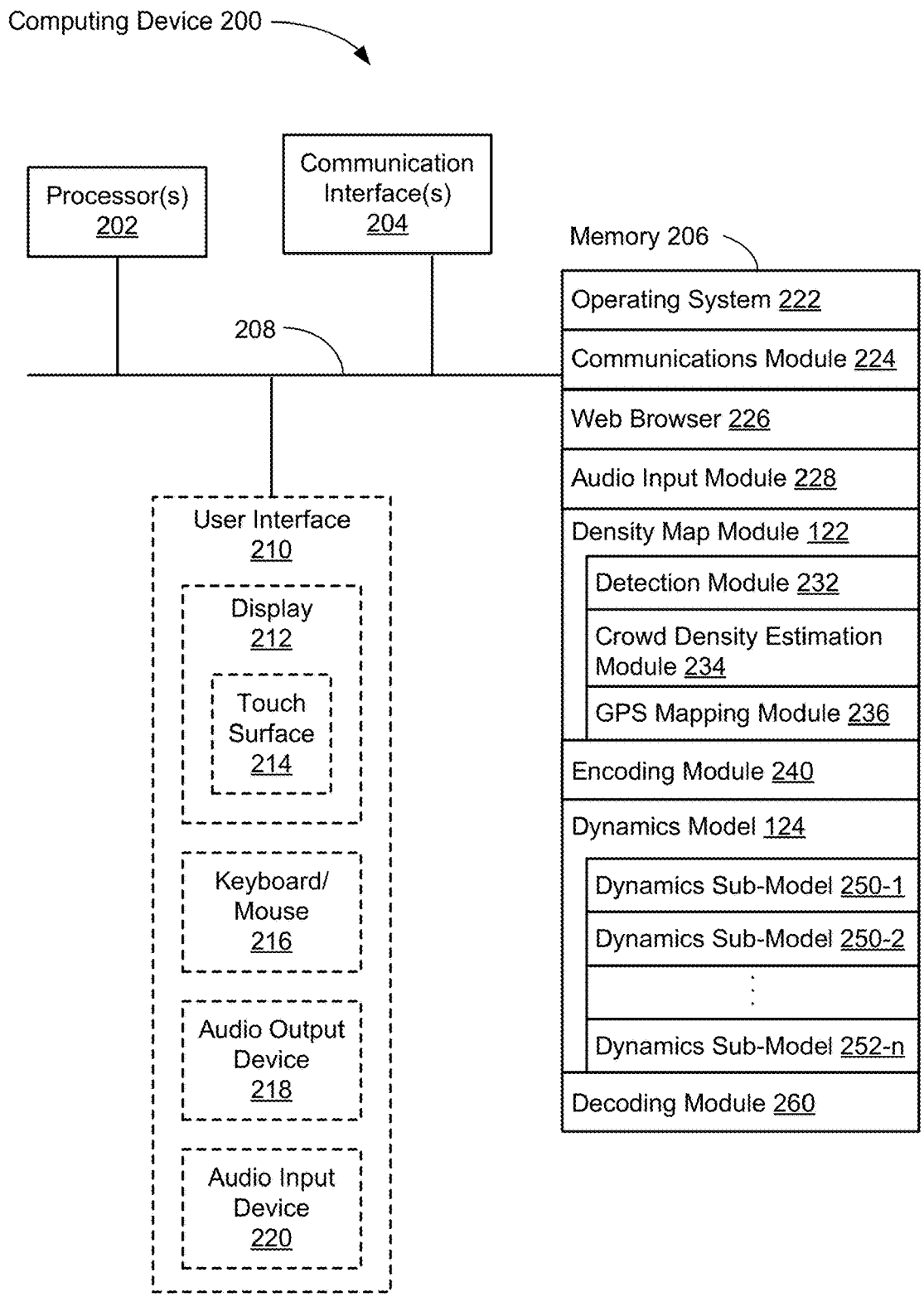
FIG. 2 is a block diagram illustrating a computing device according to some implementations.

FIG. 2A is a block diagram illustrating a computing device 200, corresponding to computing system 120, that can train and/or execute dynamics model 124 in accordance with some implementations. Various examples of the computing device 200 include a desktop computer, a laptop computer, a tablet computer, and other computing devices that have a processor capable of training and/or running dynamics model 124. The computing device 200 may also be a data server that hosts one or more databases (e.g., database of images or videos), models, or modules or may provide various executable applications or modules. The computing device 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The computing device 200 typically includes a user interface 210. The user interface 210 typically includes a display device 212 (e.g., a screen or monitor). In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive surface 214 (e.g., a touch-sensitive display), a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition software to supplement or replace the keyboard. An audio input device 220 (e.g., a microphone) captures audio (e.g., speech from a user).

The memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a density map module 122 for transforming images (e.g., real images such as a photograph of a frame from a video) into density maps. The density map module 122 may include a detection module 232 that identifies individuals within the images. Individuals may include persons, non-human animals, motorized vehicles, and non-motorized vehicles. The detection module 232 may also identify both moving (e.g., mobile) and non-moving (e.g., stationary) objects, such as a moving car or a pedestrian stopped at a cross walk. The density map module 122 may also include a crowd density estimation module 234 that computes a crowd density value for each logical pixel of the crowd density map 112. The crowd density value represents a number of individuals or objects per unit area of the physical venue as shown in the captured image. The density map module 122 may also include a global positioning system (GPS) mapping module 236 that can map GPS information to the captured images or video frames;
- an encoding module 240 that transforms a temporal sequence of images into a feature map of the crowd dynamics from the past to the present time;
- a dynamics model 124 that generates a predictive crowd density map 114 for a future time. The dynamics model 124 is trained using one or more temporal sequences of images. The dynamics model 124 may include one or more dynamics sub-models 250-1, 250-2, . . . 250-$n$, referred to individually or collectively as dynamics sub-model 250-$n$. A dynamics sub-model 250-$n$ may include information specific to a venue, such as a concert or game schedule for an arena, or a train schedule for a train station. Alternatively, a dynamics sub-model 250-$n$ may include information such as weather (historical weather and/or a weather forecast), day-of-week, time of day, or context annotations; and
- a decoding module 260 that transforms a predictive feature map of the crowd dynamics from the present to a future time into one or more predictive crowd density maps 114.

In some implementations, the memory 206 stores metrics and/or scores determined by the dynamics model 124. In addition, the memory 206 may store thresholds and other criteria, which are compared against the metrics and/or scores determined by the dynamics model 124. For example, the dynamics model 124 may determine (e.g., calculate) a confidence level or an accuracy score for each generated predictive crowd density map 114. In another example, the dynamics model 124 may be updated with feedback on the accuracy of its forecasts and the dynamics model 124 may compare a calculated confidence level with feedback regarding a previous forecast that is stored in the memory 206 and adjust the confidence level accordingly.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 3A:
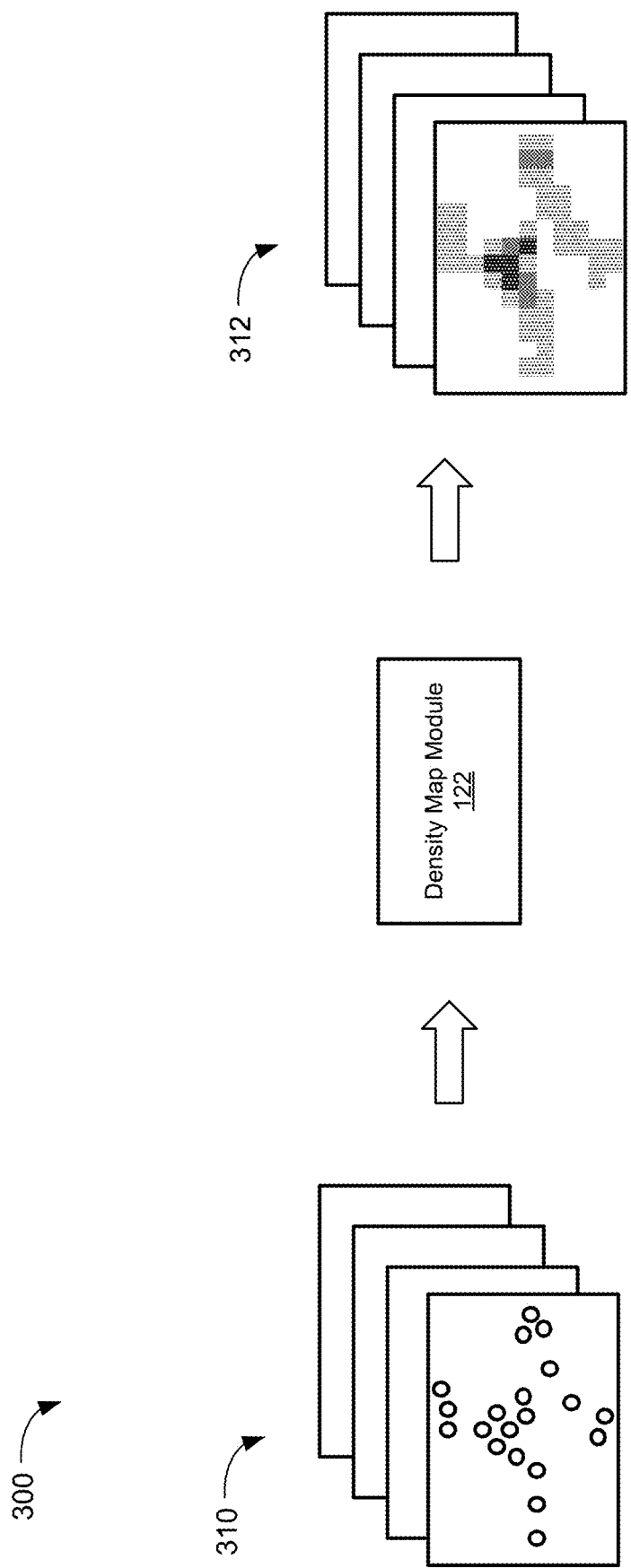
FIG. 3A illustrates how images are transformed into density maps according to some implementations.

FIG. 3A illustrates how images are transformed into density maps according to some implementations. Density map module 122 receives one or more images and transforms each image 310 of the one or more images into a density map 312. For a given image 310, the density map module 122 identifies individuals and/or objects in the image 310. The density map module 122 subdivides the image 310 into a respective set of logical pixels based on a predetermined mapping. The predetermined mapping dictates a mapping between a logical pixel and a pixel of the image 310, described below with respect to FIGS. 3B and 3C. The density map module 122 then calculates a crowd density value for each logical pixel in a density map 312 (e.g., estimates how crowded each location in each image is). The crowd density map is generated using the calculated crowd density value for each logical pixel, and thus represents a number of individuals and/or objects per unit area.

In some implementations, the one or more images 310 are obtained from a video, such as a surveillance video. For example, a dataset may include 100 videos of a crowd captured in 15 different places with unique camera poses and positions. Each of the videos may include 150 frames at 30 frames per second (fps), and the locations of pedestrians may be fully annotated in each frame. In another example, a dataset may include distinct scenes of a crowd that is captured by a similar oblique point-of-view. The dataset may include annotations of pedestrians every 10 frames (e.g., sparse annotation). The dataset may be separated into a plurality of training sets used to train a dynamics model (the process of which is described below with respect to FIG. 4B). A training set may include one or more distinct scenes.

Figure 3B:
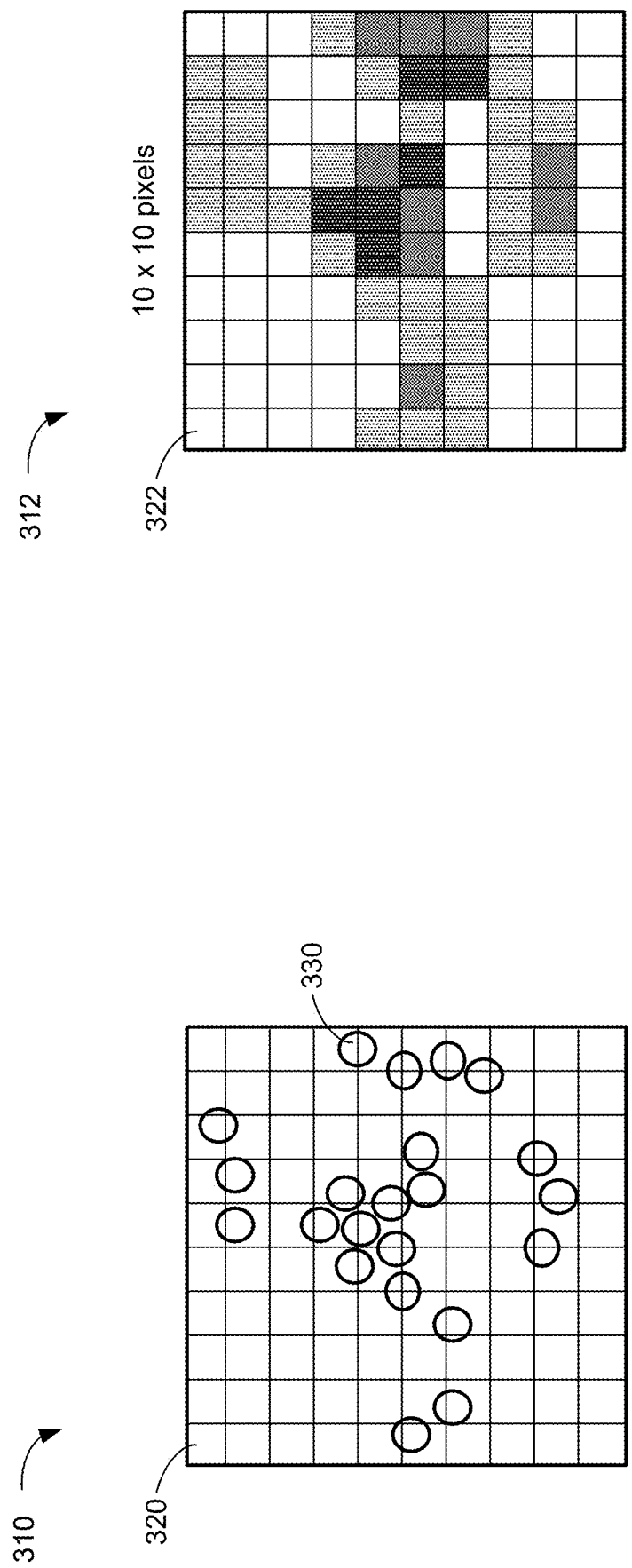
FIGS. 3B and 3C illustrate examples of mapping between logical pixels and image pixels according to some implementations.

Referring to FIG. 3B, image 310 includes a plurality of individuals and/or objects 330. In this example, each individual and/or object 330 is represented by a circle and the image 310 is subdivided into a plurality of pixels 320. The density map 312 that corresponds to the image 310 is also divided into a plurality of logical pixels 322. Each logical pixel 322 has a calculated crowd density value, represented visually in the density map 312 via color, shading, or hue. In this example, logical pixels 322 that have a high crowd density value are represented by a dark pattern and logical pixels 322 that have a low crowd density value are represented by a light pattern. In some cases, the density map 312 may be a heat map and the crowd density value may be represented by a differences in, for example, color, hue, or saturation.

Figure 3C:
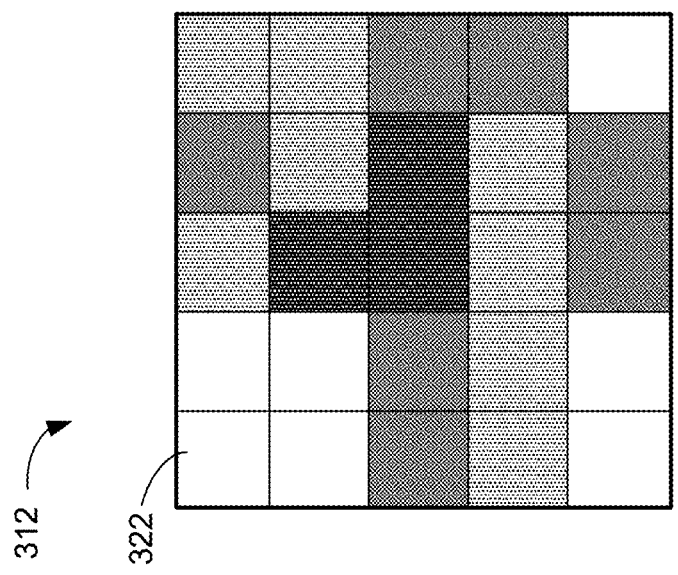
Figure 3C:
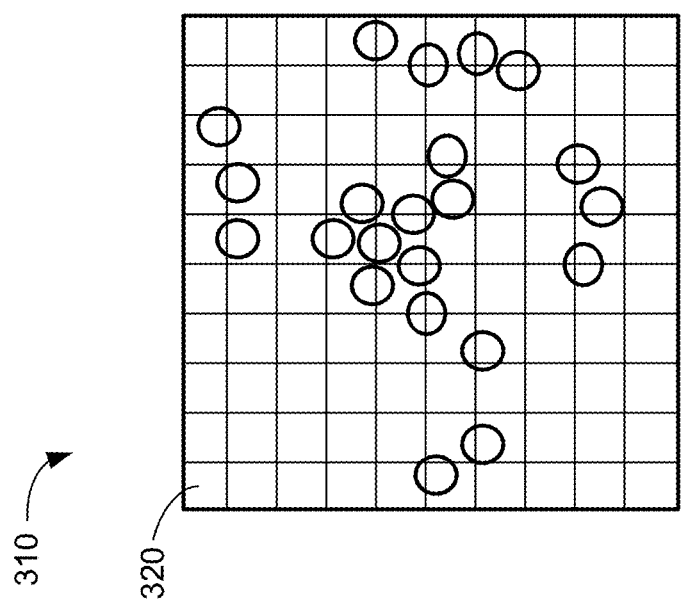

In some implementations, each logical pixel 322 in the density map 312 corresponds to one or more pixels 320 of the image 310. For example, FIG. 3B shows a one-to-one mapping between logical pixels 322 in a density map 312 and pixels 320 in an image 310 (e.g., one logical pixel 322 in the density map 312 corresponds to one pixel 320 in the image 310). Alternatively, as shown in FIG. 3C, each logical pixel 322 in a density map 312 may correspond to more than one pixel 320 in the image 310 (in this example, each logical pixel 322 in the density map 312 corresponds to four pixels 320 in the image 310).

In some implementations, in order to calculate a crowd density value, the density map module 122 convolves the image 310 with one or more Gaussian maps in order to calculate an estimated crowd density value.

In some implementations, in order to calculate a crowd density value, the density map module 122 down-samples (e.g., shrinks, removes a portion of the data from) the image 310 in order to calculate an estimated crowd density value.

In some implementations, such as when images 310 are frames extracted from video, each image may cover a different location with possibility for overlapping coverage. In such cases, the density map module 122 may map GPS information to each image 310, thereby geo-tagging each image with an exact location.

The density map module 122 may transform any number of images 310 into a corresponding number of density maps 312. For example, the density map module may be used to transform a single image 310 into a single density map 312. Alternatively, the density map module 122 may transform a plurality of images 310 that are part of a temporal sequence of images into a plurality of density maps 312 that form a temporal sequence of density maps.

Figure 4A:
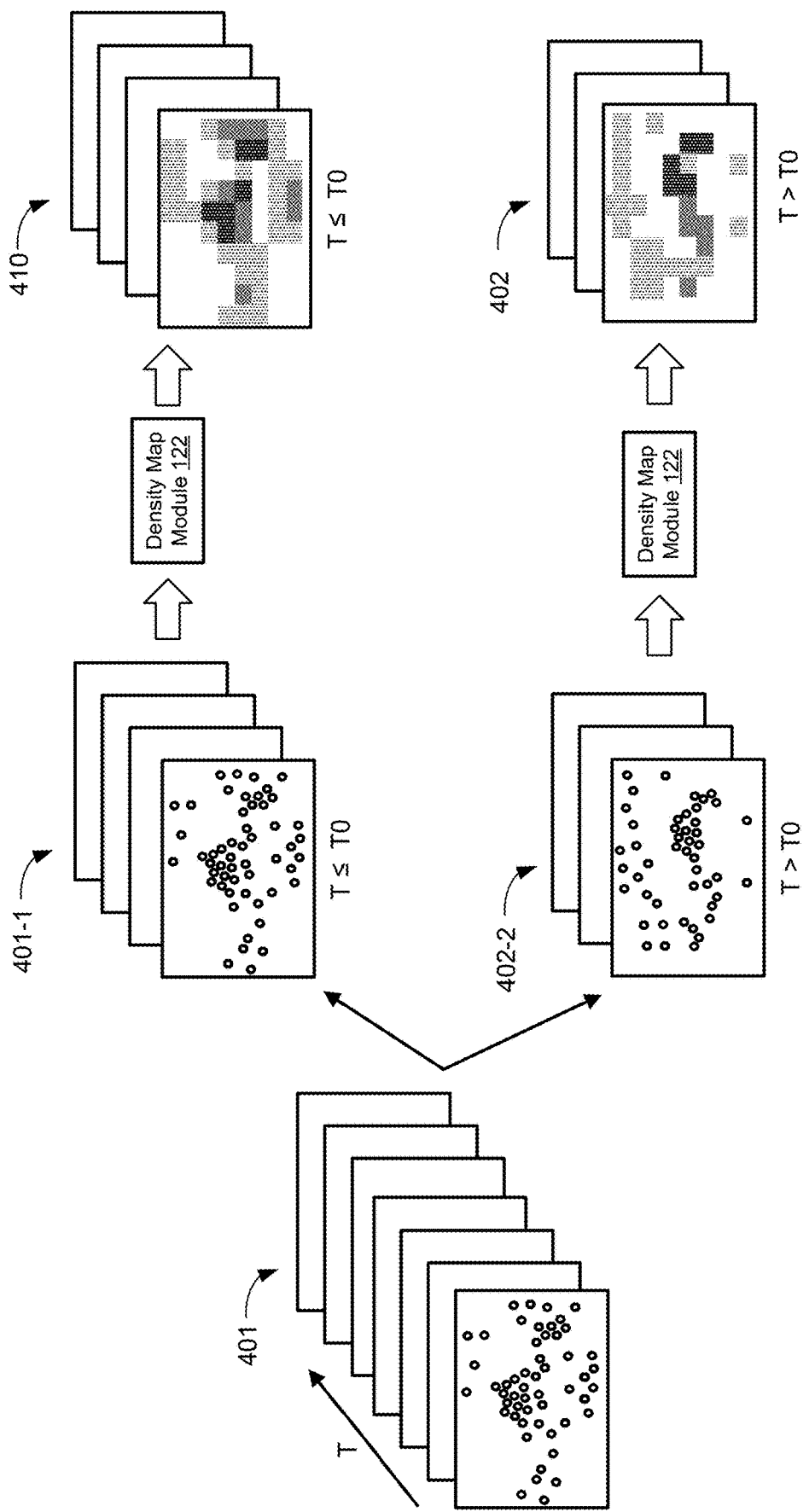
FIGS. 4A-4C illustrate training a dynamics model according to some implementations.
Figure 4B:
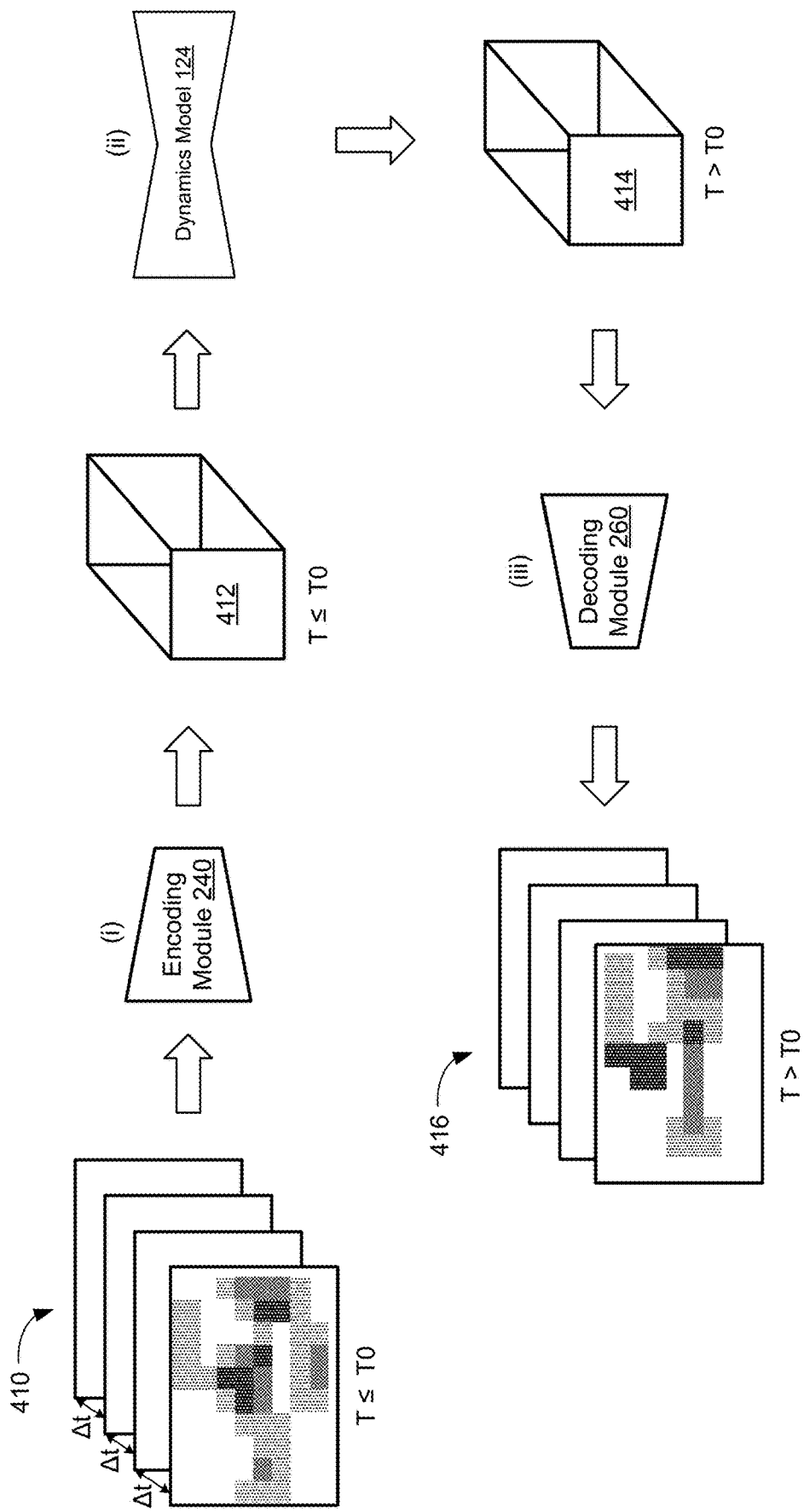
Figure 4C:
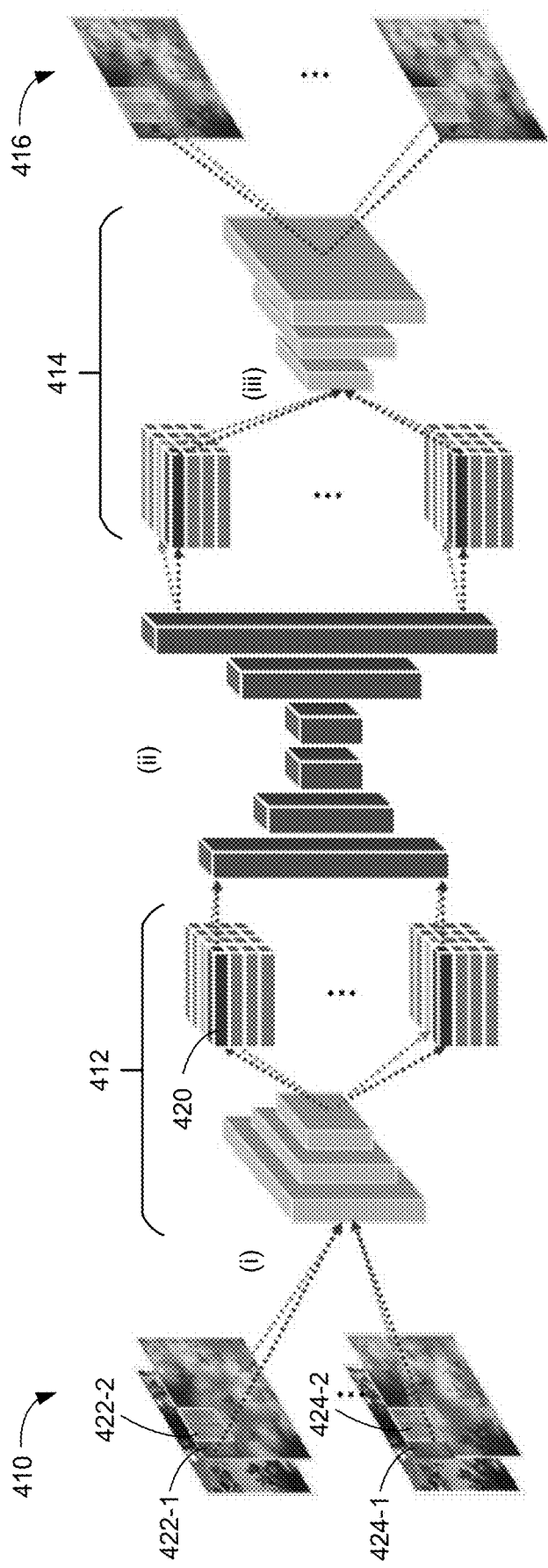
Figure 5A:
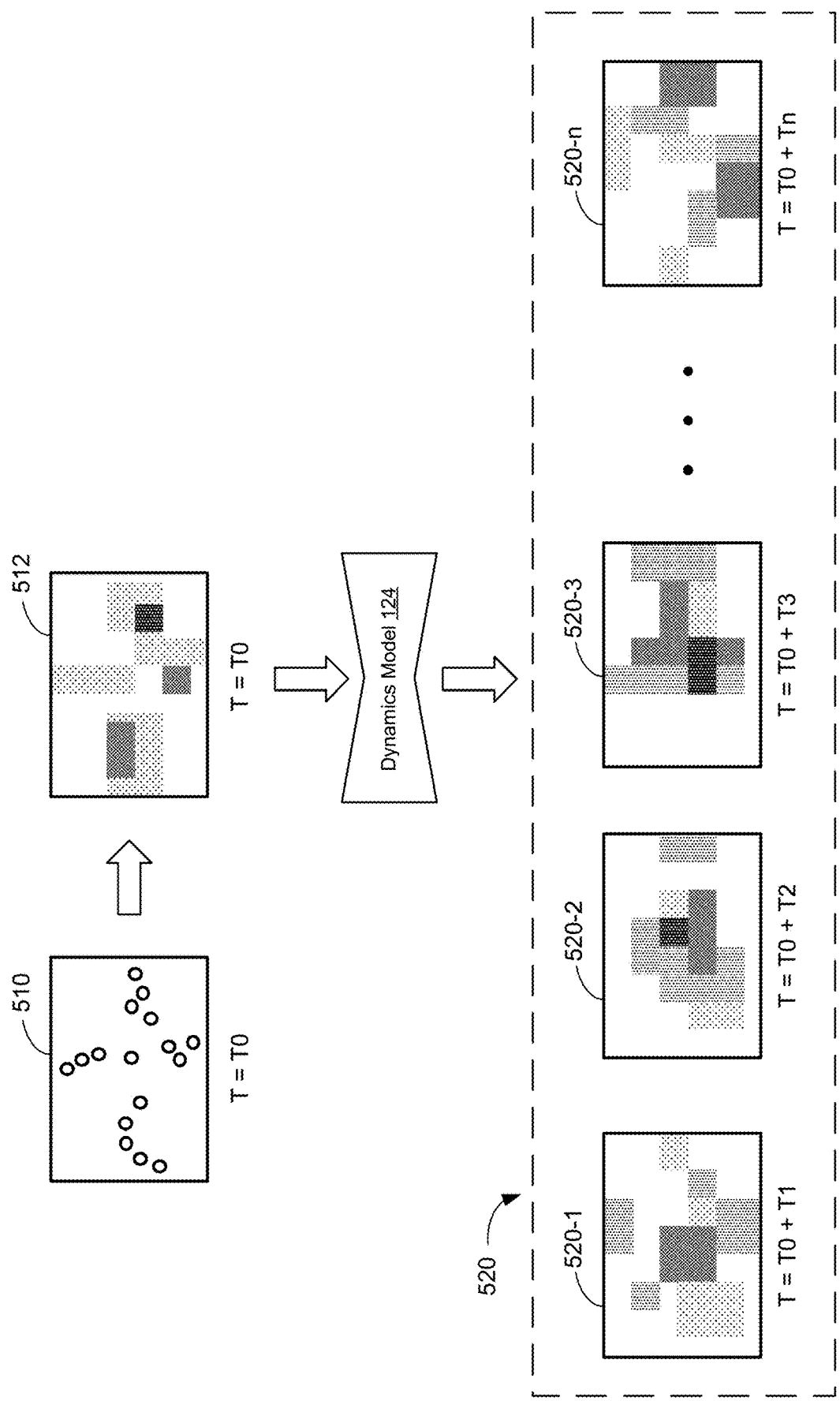
FIG. 5A illustrates using a dynamics model for forecasting crowd density according to some implementations.
Figure 5B:
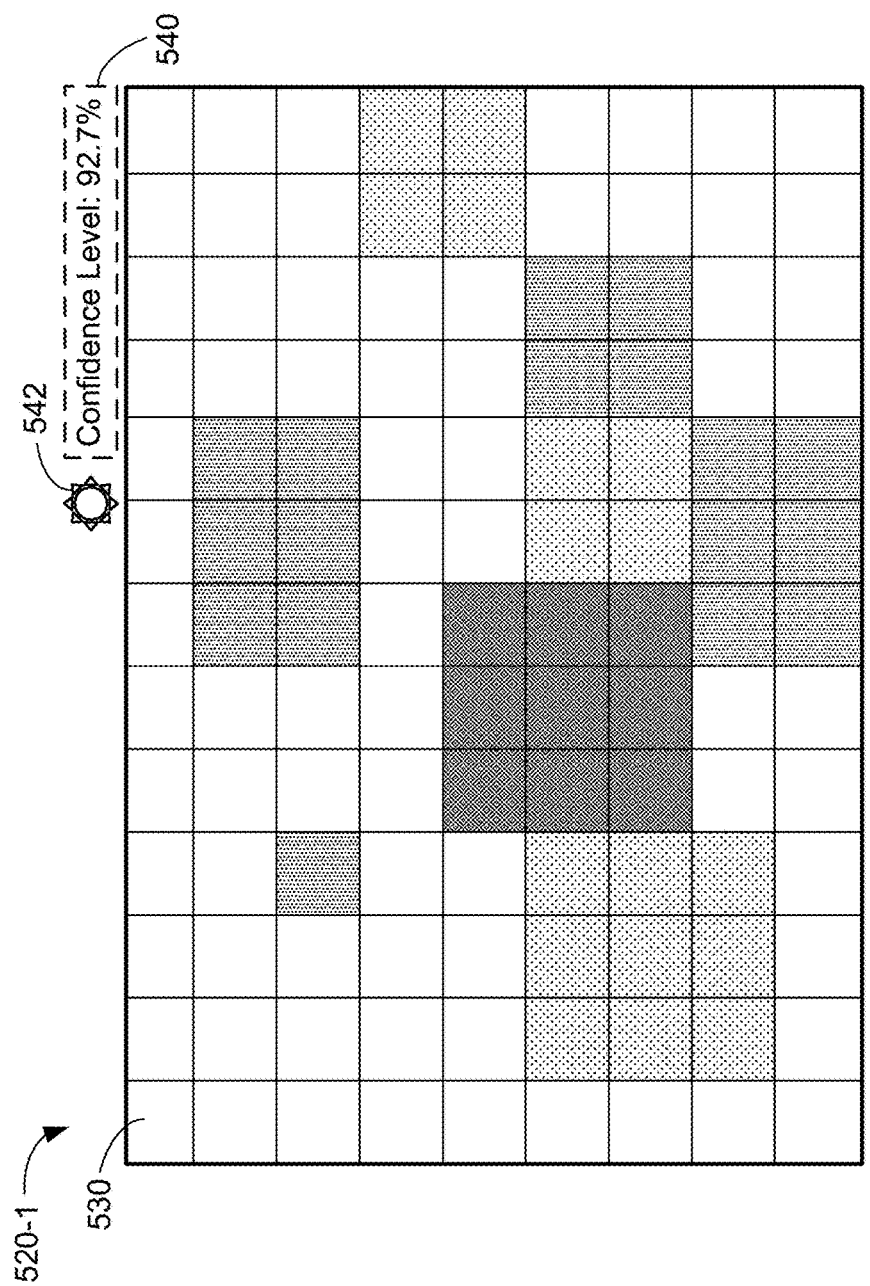
FIG. 5B is an example of a crowd density map forecast according to some implementations.

FIG. 4A-4C illustrate training a deep neural network for forecasting crowd densities according to some implementations. In some implementations, the deep neural network includes any of: a density map module 122, a dynamics model 124, an encoding module 240, and a decoding module 260. The density map module 122 is configured to transform one or more real images into one or more density maps. Details regarding the function of the density map module 122 is described below with respect to FIG. 4A. The encoding module 240 is configured (e.g., trained) to transform a plurality of crowd density maps into a feature map. The dynamics model 124 is configured (e.g., trained) to provide a forecast of crowd density at a future time given an initial crowd density map. The decoding module 260 is configured (e.g., trained) to transform a predictive feature map (output from the dynamics model 124) into one or more predictive crowd density maps. Details regarding the training and function of each of the encoding module 240, dynamics model 124, and decoding module 260 are described below with respect to FIGS. 4B and 4C.

FIG. 4A shows a temporal sequence of images 401 of a physical venue. The temporal sequence of images 401 includes a set of historical images 401-1 and a set of future images 401-2. Each image in the set of historical images 401-1 has a time that corresponds to T≤T0 and each image in the set of future images 401-2 has a time that corresponds to T>T0. The set of historical images 401-1 are used in training the dynamics model 124, and the set of future images 401-2 are used to validate the predictions of crowd density maps at future times (e.g., T>T0).

The set of historical images 401-1 is transformed (e.g., by density map module 122) into a temporal sequence of density maps 410. In some implementations, each image in the set of historical images 401-1 is transformed into a respective density map 410. The temporal sequence of density maps 410 is used as a training set to train the dynamics model 124. In some instances, the temporal sequence of density maps 410 is used to train the encoding module 240 and the decoding module 260.

The set of future images 401-2 is transformed (e.g., by density map module 122) into a set of ground truth density maps 402. In some implementations, each image in the set of future images 401-2 is transformed into a respective ground truth crowd density map. The ground truth density maps 402 are used to evaluate the accuracy of the predicted crowd density maps output from the dynamics model 124. Based on feedback from the evaluations, the models can be modified to be more accurate.

Referring to FIG. 4B, an encoding module 240 receives the temporal sequence of density maps 410 for a physical venue and (i) transforms the temporal sequence of density maps 410 into a feature map 412 of the physical venue. A density map of the temporal sequence of density maps 410 that has been extracted from the t-th input video frame of a video or the t-th image from the temporal sequence of images 401 having a size W×H (e.g., width times height) can be represented as $c_t \in [0,1]^{W \times H}$. The input sequence of crowd density maps (corresponding to the temporal sequence of density maps 410) of length $T_{in}$ can be expressed as $C_{in}=[c_{t-T_{in}+1}, \ldots, c_t]$. The encoding module 240, represented by ε, is applied to the temporal sequence of density maps 410, thereby transforming the temporal sequence of density maps 410 into a feature map 412 that has K-dimensions (e.g., $z_t=\varepsilon(t)$). Thus, the feature map 412, having the dimensions W'×H' (where W'<W and H'<H)×K× $T_{in}$, can be expressed as $Z_{in}=[\varepsilon(c_{t-T_{in}+1}), \ldots, \varepsilon(c_t)] \in R^{W' \times H' \times K \times T_{in}}$.

The temporal sequence of density maps 410 and corresponding feature map 412 cover a range of time T≤T0 (e.g., $T_{in}$) at the physical venue. The dynamics model 124 receives the feature map 412 and, using successive pairs of density maps 410 in the feature map 412, the dynamics model 124 learns spatiotemporal changes of crowd density at the physical venue. As training progresses, the dynamics model 124 is able to (ii) output a predictive feature map 414 for one or more time(s) in the future (e.g., T>T0) at the physical venue. The predictive feature map 414, having the dimensions W'×H' (where W'<W and H'<H)×K×$T_{out}$, can be expressed as: $Z_{out}=[\varepsilon(c_{t+1}), \ldots, \varepsilon(c_{t+T_{out}})] \in R^{W' \times H' \times K \times T_{out}}$. In some cases, $T_{out}$ has a different value than $T_{in}$. The dynamics model 124 is trained by minimizing the mean-squared error (MSE) for an input mini-batch of K-dimensional feature map sequences (Z):

$$L(Z) = \frac{1}{B}\sum_{b=1}^{B} \left(MSE(Z_{out}^{(b)}, M(Z_{in}^{(b)}))\right).$$

A decoding module 260, represented by D, is applied to the predictive feature map 414 (e.g., $D(z_t) \in [0,1]^{W \times H}$), thereby (iii) transforming the predictive feature map 414 into predictive density maps 416. The predictive density maps 416 are a sequence of crowd density maps of length $T_{out}$, represented as $C_{out}=[c_{t+1}, \ldots, c_{t+T_{out}}]$. Each predictive density map 416 is a forecast of crowd density at a future time (e.g., T>T0) at the physical venue.

The encoding module 240 and decoding module 260 are trained jointly using a collection of crowd density maps. For example, given a mini-batch of input sequences of size B, represented as $C=C_{in}^{(1)}, \ldots, C_{in}^{(B)}$, the trainable parameters of the encoding module 240 ($\varepsilon$) and decoding module 260 (D) are trained by minimizing the binary cross-entropy (BCE) loss L(C) of:

$$L(C) = \frac{1}{B}\sum_{b=1}^{B}\left[\frac{1}{T_{in}}\sum_{c \in C_{in}^{(b)}} BCE(c, D(\varepsilon(c)))\right].$$

Additional details regarding the training process is shown in FIG. 4C. The encoding module 240 decomposes each density map 410 of the temporal sequence of density maps 410 into multiple patches 420 (e.g., multiple spatial portions) that spatially overlap with one another. A patch 420 can be thought of as a temporal sequence that includes a respective portion, less than all, of each density map of the temporal sequence of density maps 410. For example, a first density map, of a successive pair of density maps, that represents crowd density at a first time (T') includes a plurality of spatially overlapping portions (e.g., portions 422-1, 422-2). Each portion covers a physical (e.g., geographical) area that is smaller than a physical area covered by the first density map. A second density map, of the successive pair of density maps, that represents crowd density at a second time (T"), distinct from the first time (e.g., T'≠T"), includes a plurality of spatially overlapping portions (e.g., portions 424-1, 424-2). The portions 422-1 and 424-1 show the crowd density in a same physical area at different times (T' and T", respectively) and form a patch 420 (e.g., formed by a successive pair of images) that provides temporal information of crowd dynamics of the area. The feature map 412 includes a compact feature representation of each patch 420. The encoding module 240 spatially overlaps the patches 420 into a K-dimension latent space, which allows observation of spatiotemporal patterns in a portion region (e.g., a small portion, less than all) of the of crowd density maps. This simplifies the complex crowd dynamics of an entire set of density maps 410 into simpler spatiotemporal patterns. Thus, the dynamics model 124 learns patch-wise density dynamics in the compact latent space (opposed to trying to learn complex density dynamics over large areas encompassing many groups and individuals). For example, instead of trying to learn crowd dynamics over a large area such a cafeteria, which may include many different individuals and groups (such as people sitting and eating, people moving slowly in a line, and people wandering to find a seat), the dynamics model 124 can learn simplified spatiotemporal patterns such as people in a first area (e.g., at a table) are stationary and people in a second area (e.g., in a line) are slowly moving in a predictable path (e.g., a straight line).

In some implementations, the K-dimensional latent feature space is a multidimensional latent feature space (e.g., K>1, not a single-dimensional feature). As described above, crowd dynamics can be extremely complex, especially when there are multiple individuals or groups that are behaving or moving independently of one another. Thus, training the dynamics model 124 to learn spatiotemporal patterns and perform forecasting in the latent space allows the dynamics model to treat each patch 420 independently of one another, thereby simplifying the problem of complex crowd dynamics.

In some instances, the encoding module 240 is a fully convolutional encoder. In some instances, the decoding module 260 is a fully convolutional patch decoder.

In some implementations, the performance of the dynamics model 124 is evaluated by comparing the forecasted density map (e.g., predictive density map 416) generated by the dynamics model 124 to a ground truth crowd density map. For example, if the dynamics model 124 outputs a predictive density map 416 for a time $T_{future}$>T0, the predictive density map 416 is compared to a ground truth density map (e.g., a ground truth density map from the set of ground truth density maps 402 that are obtained from the set of future images 401-2, described above with respect to FIG. 4A) that corresponds to the time, $T_{future}$.

In some implementations, comparing the predictive density map 416 to a corresponding ground truth density map 402 includes smoothing each of the density maps 410 that are input into the dynamics model 124 (e.g., indirectly input to the dynamics model 124 via the encoding module 240), the predictive density map 416 output from the dynamics model 124, and the corresponding ground truth density map 402. For example, a spatiotemporal Gaussian filter with a pre-defined kernel size ($\sigma$) is applied to each of these density maps (e.g., crowd density maps 410, predictive density map 416, and ground truth density map 402) in order to smooth each of the density maps. The kernel size ($\sigma$) determines how accurately the dynamics model 124 is expected to perform. The kernel size ($\sigma$) can be thought of as "how much approximation" the dynamics model 124 will do with a larger kernel size ($\sigma$) corresponding to "more approximation" and a smaller kernel size ($\sigma$) corresponding toe "less approximation." Thus, when the predefined kernel size ($\sigma$) is small, the results (e.g., predictive density map 416) of the prediction are expected to fit the ground truth density map 402 more strictly compared to a larger predefined kernel size ($\sigma$).

Figure 4E:
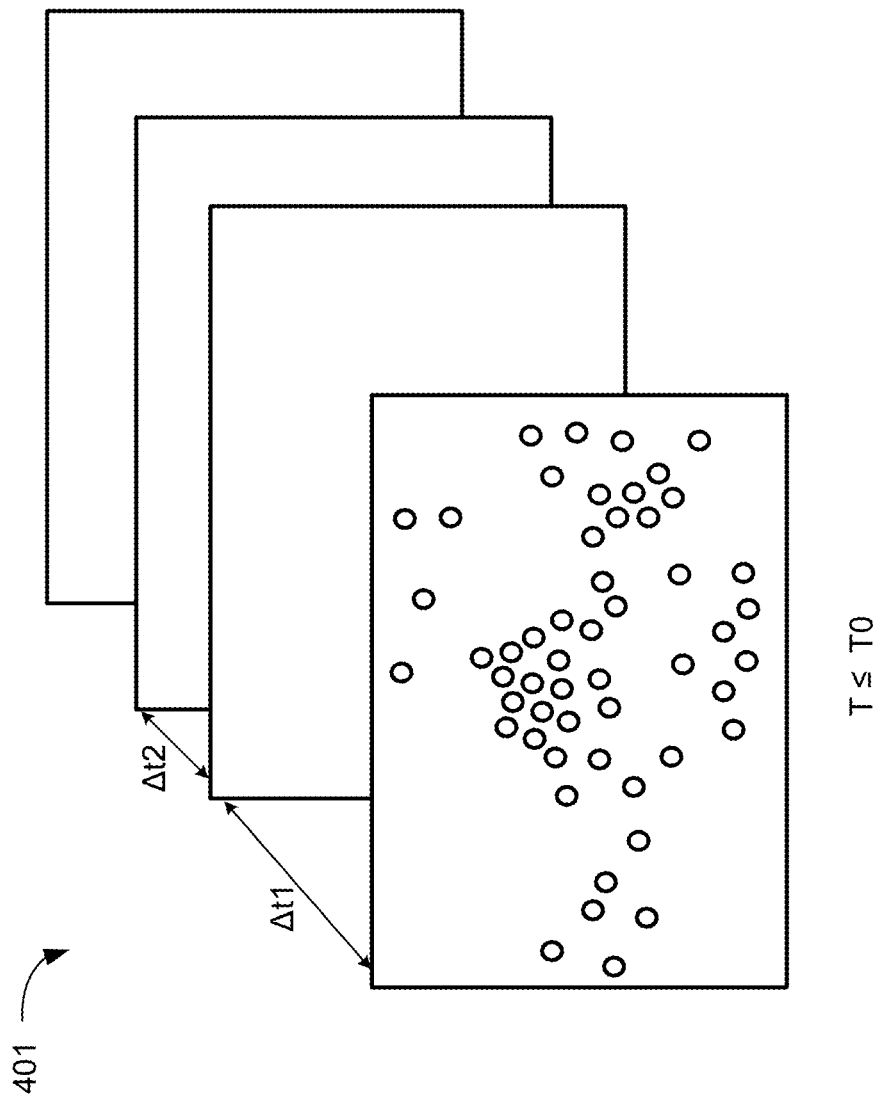

In some implementations, as shown in FIG. 4E, a time delta (e.g., time difference) between successive images in the temporal sequence of images 401 (and therefore successive density maps 410 in the temporal sequence of density maps) has a value ($\Delta t$) that is consistent across the temporal sequence of images 401. For instance, a temporal sequence of images may include 10 successive images taken 10 minutes apart. In another example, a temporal sequence of images extracted from a video may include 120 frames taken 1 minute apart from a video that is two hours long. In some implementations, the time delta has a value ($\Delta t$) that is between 1 millisecond and one week (e.g., successive images in a temporal sequence of images are captured anywhere from 1 millisecond apart from one another to 1 week apart from one another).

Figure 4F:
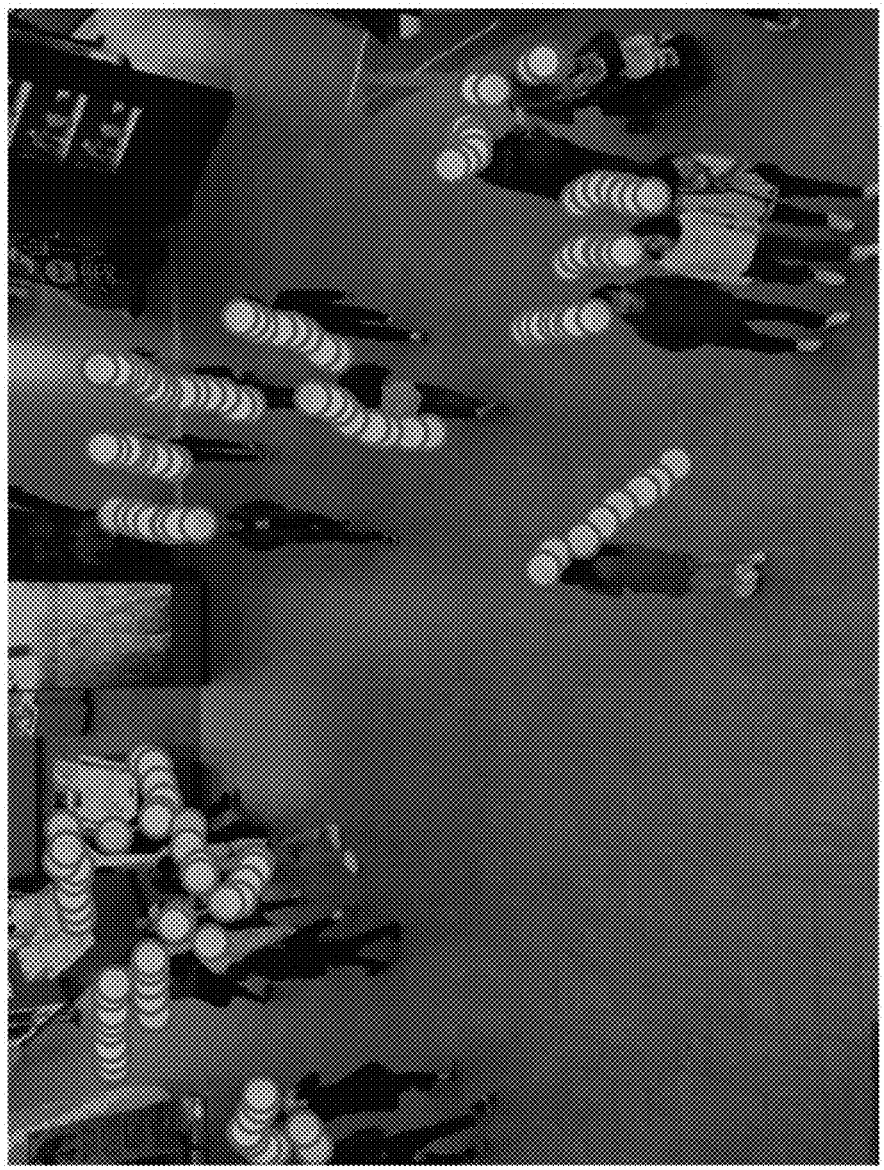
FIG. 4F illustrates an example of an annotated image according to some implementations.

In some embodiments, as shown in FIG. 4F, a time delta (e.g., time difference) between successive images in the temporal sequence of images 401 has a value ($\Delta t$) that is not consistent across the temporal sequence of images 401 (e.g., $\Delta t1 \neq \Delta t2$). In such instances, one or more images of the temporal sequence of images 401 may be removed to create a set of images that have a time delta with a value ($\Delta t$) that is consistent. Alternatively, the temporal sequence of images 401 may be interpolated to generate set of images that have a time delta with a value ($\Delta t$) that is consistent. In either case, the resulting set of images that have a time delta with a value (Δt) that is consistent can then be used to obtain a temporal sequence of density maps 410 that has a time delta with a value (Δt) that is consistent.

In some implementations, each of the successive pairs of density maps in the feature map 412 are categorized according to a level of difficulty. For example, successive pairs of density maps may be classified as easy, medium, or difficult. In some implementations, the dynamics model 124 is initially trained using successive pairs of density maps that are categorized as easy. Following training using successive pairs of density maps that are categorized as easy, the dynamics model 124 is then trained using successive pairs of density maps that are categorized as medium, followed by successive pairs of density maps that are categorized as difficult. This progression of the training process is designed so that the dynamics model 124 is not provided with difficult training sets early on the in training process, possibly leading to the dynamics model 124 being unable to provide a forecast or resulting in an error in the dynamics model 124.

In some implementations, the dynamics model 124 is trained using additional information associated with each of the images in the temporal sequence of images 401 (and therefore the corresponding density maps 410 in the temporal sequence of density maps). The additional information can include one or more of: (i) a timestamp for each of the images 401/density maps 410; (ii) one or more weather parameters associated with each of the images 401/density maps 410; (iii) a day-of-week indicator for each of the images 401/density maps 410; and (iv) scene context annotations for each logical pixel in each of the images 401/density maps 410. In some implementations, the additional information associated with each of the images in the temporal sequence of images may be automatically estimated or manually provided by a user or annotator. FIG. 4F provides an example of an image 430 that has been annotated with locations of pedestrians (shown as circles).

In some implementations, the dynamics model 124 may undergo training for a first time (e.g., the dynamics model 124 is initially untrained). Alternatively, the dynamics model 124 may undergo additional training in order to improve or update the model.

FIG. 5A illustrates using a trained dynamics model 124 for forecasting crowd density according to some implementations. A computer system, corresponding to computer system 120 and/or computing device 200, receives a current image 510 of a physical venue at a present time (e.g., T=T0). The computer system transforms (e.g., via the encoding module 240) the current image 510 into a current crowd density map 512 that represents a crowd density of the current image 510. In response to receiving the current crowd density map 512, the dynamics model 124 generates one or more predictive crowd density maps 520. Each predictive crowd density map (e.g., predictive crowd density map 520-1, 520-2, 20-3, . . . , 520-n) of the one or more predictive crowd density maps 520 is a forecast of the crowd density at the physical venue at a specific time in the future (e.g., T>T0).

In some implementations, the computer system may receive a specified future time offset (T1) from a time (T0) corresponding to the current image 510 and the predictive crowd density map 520 generated by the dynamics model 124 is a prediction of spatiotemporal changes in crowd density according to the current image 510 and the specified future time offset (T1).

In some implementations, the computer system may receive a specified future time offset (T1) from a time (T0) corresponding to the current image 510 and the dynamics model 124 is applied to the current crowd density map 512 and the specified future time offset (e.g., T=T0+T1) so that the predictive crowd density map 520 generated by the dynamics model 124 is a crowd density map forecast at the physical venue at the specified future time offset (T=T0+T1).

In some implementations, the specified future time offset is expressed (e.g., provided) as an integer multiple (N) of the time delta value (Δt). In such cases, the dynamics model 124 is applied N times sequentially, starting with the current crowd density map 512. For example, if a specified future time offset T1 is equal to 2Δt, then the dynamics model 124 is applied to the current crowd density map 512 to generate an intermediate predictive crowd density map, and the dynamics model 124 is subsequently applied to the intermediate predictive crowd density map in order to generate the predictive crowd density map 520 for the specified future time offset T=T0+T1, or in other words, T=T0+2Δt.

In some implementations, a difficulty of forecasting depends on the time offset. For example, a crowd density in the near future is easier to forecast than a crowd density for a distant future.

In some implementations, a difficulty of forecasting depends on spatial patterns of crowds. For example, people walking at scramble intersections show more complex crowd dynamics than people walking side-by-side.

In some implementations, the dynamics model 124 can predict a level of difficulty in forecasting a specific future based on the time offset and spatial pattern (e.g., a specific location or physical venue at a specific time or time offset). This hardness prediction can be used in further training of the dynamics model 124. The hardness prediction cab ne trained in many ways, for example, by predicting a difficulty based on current forecasting accuracy estimates or feedback on the accuracy of current forecasts.

FIG. 5B is an example of a crowd density map forecast according to some implementations. The predictive crowd density map 520-1 is subdivided into a plurality of logical pixels 530 (corresponding to logical pixels 322 of density map 312). Each logical pixel 530 has a crowd density value that represents an expected or forecasted crowd density at a physical location in the current image 510 corresponding to the respective logical pixel 530. In the example shown in FIG. 5B, the forecasted crowd density is visually represented via dark and light patterns where dark patterns correspond to denser regions and light patterns correspond to less dense (e.g., more sparse) portions of the physical venue.

In some implementations, the predictive crowd density map 520-1 may include additional information that may either be displayed visually as part of the predictive crowd density map 520-1, as annotations to the predictive crowd density map 520-1, or included as part of the metadata of the predictive crowd density map 520-1. The additional information an include one or more of: (i) a date and/or timestamp that represents the specified future time offset; (ii) one or more weather forecasts for the physical venue specified at the future time offset; (iii) a day-of-week indicator for the specified future time offset; and (iv) one or more scene context annotations for one or more logical pixel 530 in the predictive crowd density map 520-1. For example, as shown in FIG. 5B, the predictive crowd density map 520-1 includes forecast confidence level 540 (e.g., an estimated forecast accuracy) and a forecasted weather 542 at the time offset.

Figure 5C:
FIG. 5C is an example of a crowd density map according to some implementations.

FIG. 5C shows an example of a crowd density map, in this example, a crowd density heat map. The crowd density map is overlaid on top an image (e.g., a real image) to illustrate how the crowd density map is representative of the number of mobile objects (in this case, humans) in the image.

Figure 6C:
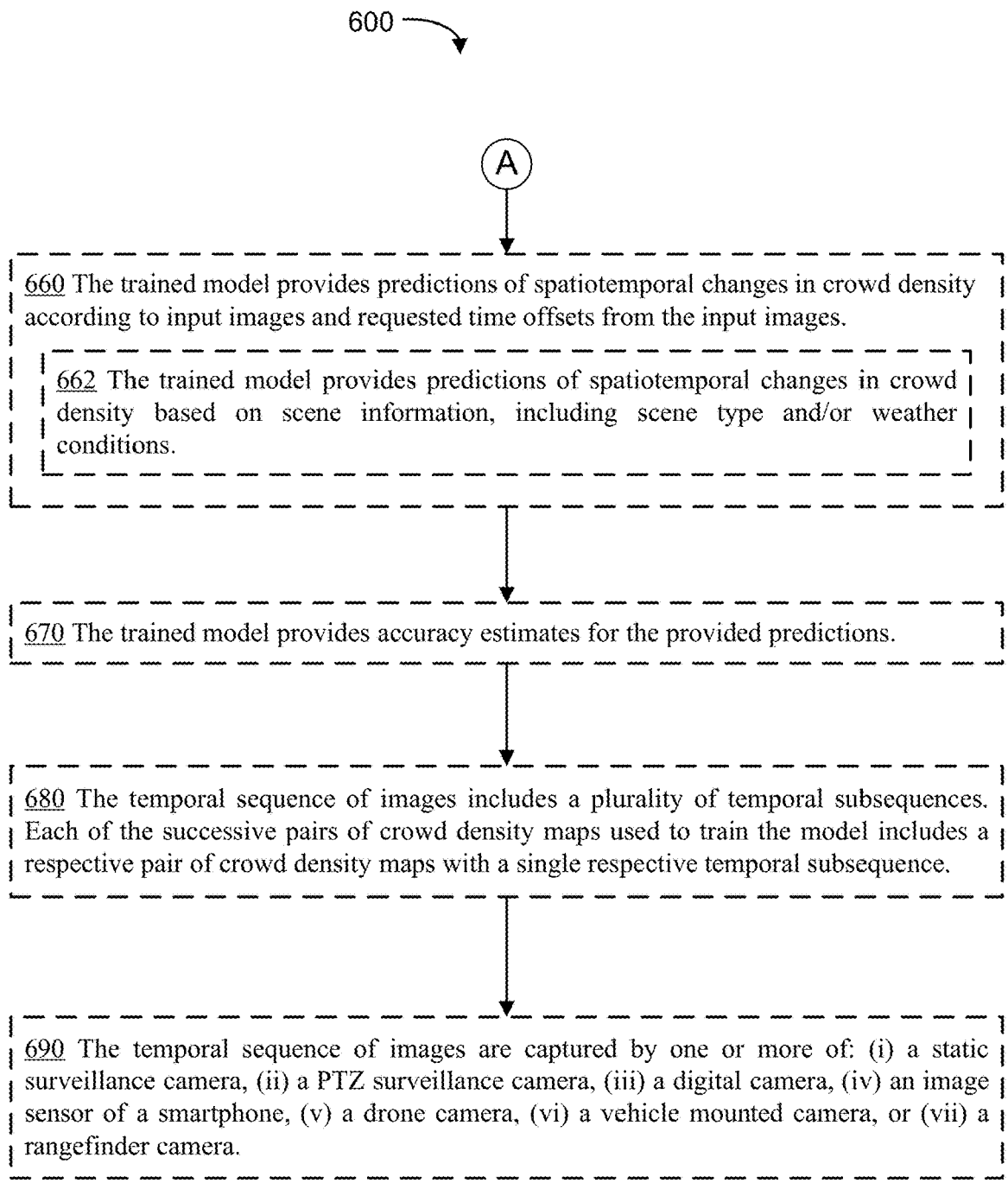

FIGS. 6A-6C provide a flow diagram of a method 600 for modeling crowd movement according to some implementations. The steps of the method 600 may be performed by a computer system 120, corresponding to a computer device 200. In some implementations, the computer includes one or more processors and memory. FIGS. 6A-6C correspond to instructions stored in a computer memory or computer-readable storage medium (e.g., the memory 206 of the computing device 200). The memory stores one or more programs configured for execution by the one or more processors. For example, the operations of the method 600 are performed, at least in part, by a density map module 122, an encoding module 240, a dynamics model 124, and/or a decoding module 260.

In accordance with some implementations, a computer system 120 or computing device 200 (610) obtains a temporal sequence of images (e.g., images 310) of a physical venue.

In some implementations, a time delta (Δt) between successive images in the temporal sequences is consistent across the images. For example, a temporal sequence of images may include 48 separate images, each of which is a frame extracted at one hour intervals from a two-day long video.

In some implementations, a time delta (Δt) between successive images in the temporal sequences is not consistent across the images. For example, a temporal sequence of images may include 48 separate images, where each frame is taken at a random time so that the time interval between successive frames is inconsistent (e.g., not the same).

For each of the images, the computer (620) subdivides the respective image into a respective set of logical pixels (e.g., logical pixels 322, 530) according to a predetermined mapping. For each logical pixel of each image, the computer (630) computes a respective crowd density (e.g., a crowd density value) that represents a respective number of mobile objects per unit of area in the physical venue at the logical pixel, thereby forming a temporal sequence of crowd density maps (e.g., density maps 312) that correspond to the temporal sequence of images. For example, each crowd density map may be heat map that is color-coded (e.g., red for very high density, yellow for high density, green for medium density, and blue for low density) to visually represent a number of individuals and/or objects per unit area.

The computer then (640) uses successive pairs of crowd density maps to train a model (e.g., dynamic model 124) on spatiotemporal changes in crowd density at the physical venue.

In some implementations, (612) the physical venue is a portion of a park, an airport, a train station, an arena, a shopping mall, a factory, a home, a body of water, the sky, or a street corner.

In some embodiments, (614) the time deltas are between one millisecond and one week. For example, two successive images of the temporal sequence of images (e.g., images 310) are captured 30 minutes apart.

In some implementations, (622) each logical pixel (e.g., logical pixel 322) corresponds to a respective single physical pixel (e.g., pixel 320) in the images (e.g., images 310). An example is provided with respect to FIG. 3B.

In some implementations, (624) each logical pixel (e.g., logical pixel 322) corresponds to a respective plurality of physical pixels (e.g., pixel 320) in the images (e.g., images 310). An example is provided with respect to FIG. 3C.

In some implementations, (632) the mobile objects are people, non-humans, motorized vehicles, non-motorized vehicles, airplanes, drones, and/or mobile robots. In some implementations, (634) computing the crowd density value at each logical pixel includes convolving each of the images with one or more Gaussian maps.

In some implementations, (636) computing the crowd density value at each logical pixel includes down-sampling (e.g., shrinking, removing a portion of the data).

In some implementations, the computer (650) obtains additional information associated with each of the images and the computer uses the additional information to train the dynamics model 124. Examples of additional information are provided with respect to FIG. 5B.

In some implementations, (652) the additional information includes one or more of: (i) a timestamp for each of the images, (ii) one or more weather parameters associated with each of the images, (iii) a day-of week indication for each of the images, and (iv) scene context annotations for each logical pixel in each of the images.

In some implementations, a computer trains the dynamic model 124. This may be the same computer system/computing device or a different computer system/computing device from the computer system/computing device that performs steps 610-650. To train the dynamics model 124, the computer categorizes each of the successive pairs of images as easy, medium, or difficult. The computer initially trains the dynamics model 124 using successive pairs that are categorized as easy, then continues to train the model using successive pairs that are categorized as medium, and completes training the dynamics model 124 using successive pairs that are categorized as difficult.

In some implementations, the trained dynamics model 124 (660) provides predictions of spatiotemporal changes in crowd density according to one or more input images 510 and requested time offsets (e.g., T1, T2, T3, . . . , Tn) from the input images 510.

In some implementations, (662) providing the predictions of spatiotemporal changes in crowd density also includes providing predictions according to scene information, including scene type and/or weather conditions.

In some implementations, (670) the trained dynamics model 124 provides accuracy estimates (e.g., confidence level estimate 540) for the provided predictions (e.g., predictive crowd density maps 520).

In some implementations, (680) the temporal sequence of images (e.g., images 310) includes a plurality of temporal subsequences. Each of the successive pairs of crowd density maps used to train the dynamics model 124 includes a respective pair of crowd density maps within a single respective temporal subsequence.

In some implementations, (690) the temporal sequence of images are captured by one or more of: (i) a static surveillance camera, (ii) a pan-tilt-zoom (PTZ) surveillance camera, (iii) a digital camera, (iv) an image sensor of a smartphone, (v) a drone camera, (vi) a vehicle mounted camera, or (vii) a rangefinder camera.

Figure 7B:
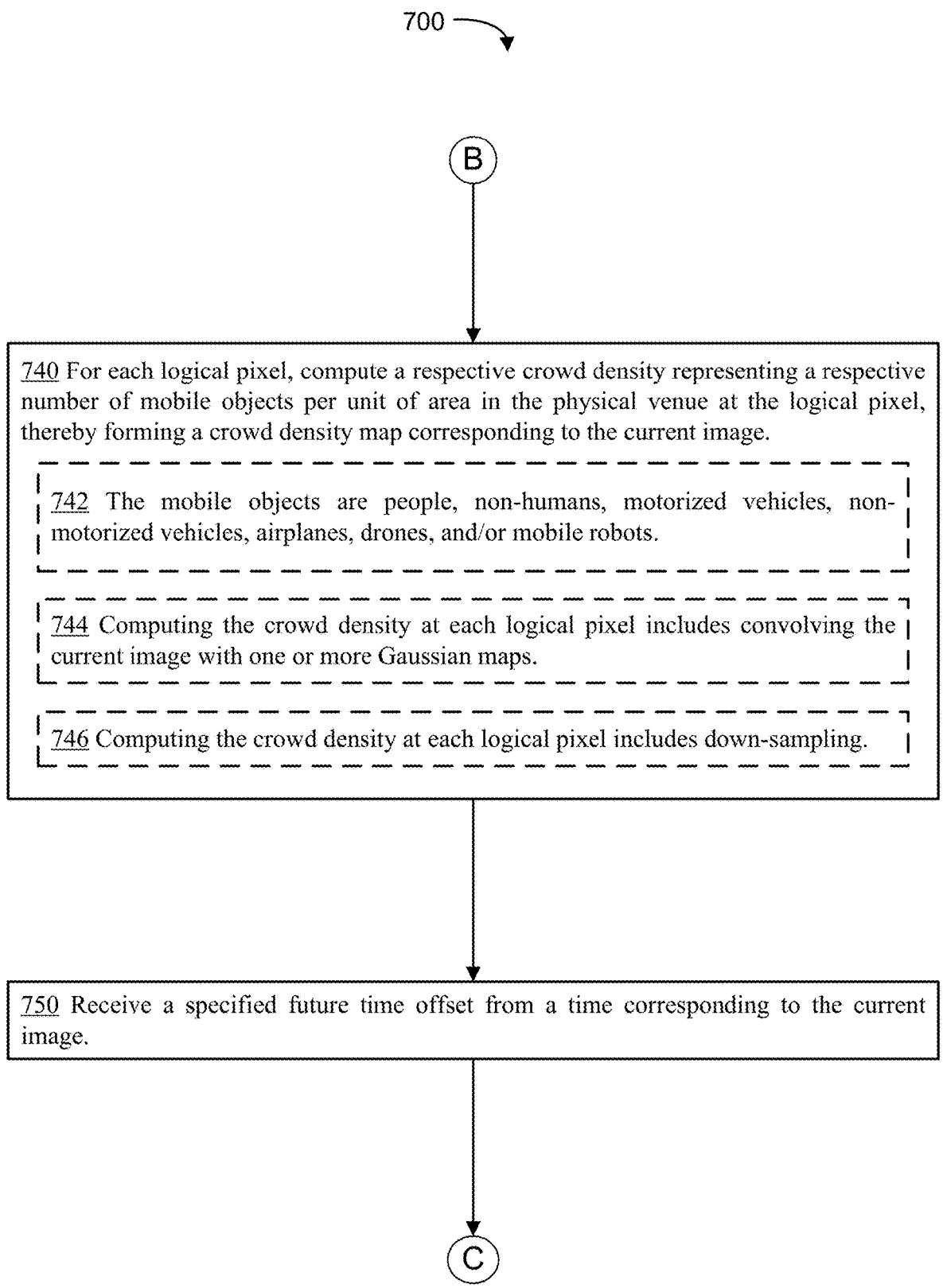
Figure 7C:
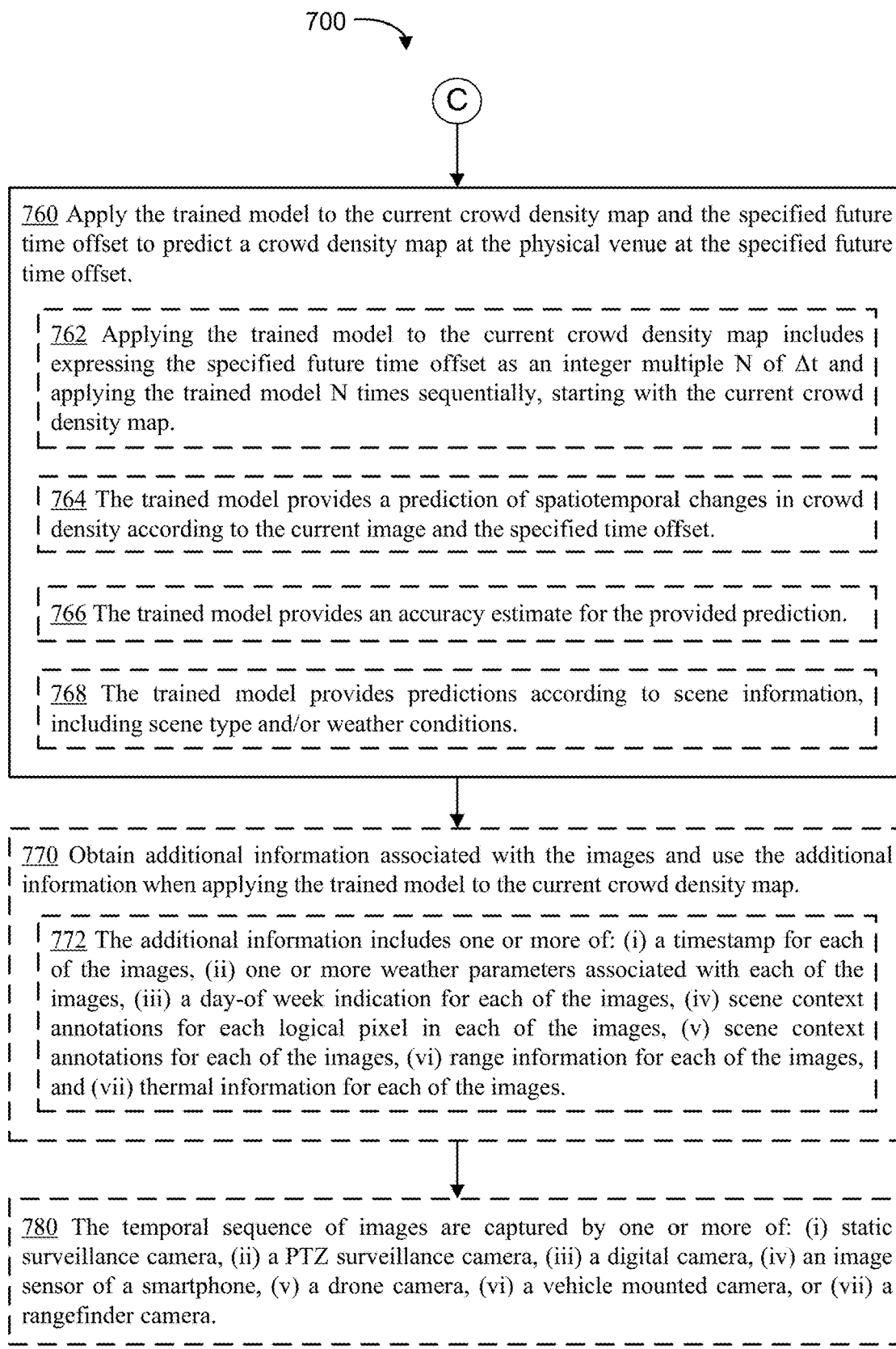

FIGS. 7A-7C provide a flow diagram of a method for predicting future crowd density maps according to some implementations. The steps of the method 700 may be performed by a computer system 120, corresponding to a computer device 200. In some implementations, the computer includes one or more processors and memory. FIGS. 7A-7C correspond to instructions stored in a computer memory or computer-readable storage medium (e.g., the memory 206 of the computing device 200). The memory stores one or more programs configured for execution by the one or more processors. For example, the operations of the method 700 are performed, at least in part, by a density map module 122, an encoding module 240, a dynamics model 124, and/or a decoding module 260.

In accordance with some implementations, a computer system 120 or computing device 200 (710) obtains a trained dynamics model 124 of crowd movement for a physical venue. The trained dynamics model 124 is trained according to a temporal sequence of images (e.g., images 310) of the physical venue.

In some implementations, a time delta (Δt) between successive images in the temporal sequences is consistent across the images. For example, a temporal sequence of images may include 60 separate images, each of which is a captured at one minute intervals.

In some implementations, a time delta (Δt) between successive images in the temporal sequences is not consistent across the images. For example, a temporal sequence of images may include 48 separate images, where each frame is taken at a random time so that the time interval between successive frames is inconsistent (e.g., not the same).

The computer then (720) obtains a current image of the physical venue and (730) subdivides the current image into a set of logical pixels 530 according to a predetermined mapping used during the training of the dynamics model 124. An example is provided with respect to FIG. 5B.

For each logical pixel, the computer (740) computes a respective crowd density that represents a respective number of mobile objects (e.g., individuals and/or objects) per unit of area in the physical venue at the logical pixel 530, thereby forming a crowd density map 520 corresponding to the current image 510.

The computer then (750) receives a specified future time offset (e.g., time offset T1, T2, . . . , Tn) from a time T0 corresponding to the current image 510 and (760) applies the trained dynamics model 124 to the current crowd density map 512 and the specified future time offset to predict a crowd density map 520 at the physical venue at the specified future time offset (e.g., at a time T=T0+T1).

In some implementations, (712) the physical venue is a portion of a park, an airport, a train station, an arena, a shopping mall, a factory, a home, a body of water, the sky, or a street corner.

In some embodiments, (714) the time deltas are between one millisecond and one week.

In some implementations, (732) each logical pixel 530 corresponds to a respective single physical pixel in the images (e.g., image 510).

In some implementations, (734) each logical pixel 530 corresponds to a respective plurality of physical pixels in the images (e.g., image 510).

In some implementations, (742) the mobile objects are people, non-humans, motorized vehicles, non-motorized vehicles, airplanes, drones, and mobile robots.

In some implementations, (744) computing the crowd density value at each logical pixel 530 includes convolving the current image 510 with one or more Gaussian maps.

In some implementations, (746) computing the crowd density value at each logical pixel 530 includes downsampling (e.g., shrinking, removing a portion of the data in the current image 510).

In some implementations, (762) applying the trained dynamics model 124 to the current crowd density map 512 includes expressing the specified future time offset as an integer multiple N of Δt and applying the trained dynamics model 124 N times sequentially, starting with the current crowd density map 512. An example is provided with respect to FIG. 5A.

In some implementations, the trained dynamics model 124 (764) provides a prediction of spatiotemporal changes in crowd density according to the current image 510 and the specified time offset (e.g., time offset T1, T2, . . . , Tn).

In some implementations, the trained dynamics model 124 (766) provides an accuracy estimate (e.g., a confidence level estimate 540) for the provided prediction (e.g., predictive crowd density map 520).

In some implementations, the trained model (768) provides predictions according to scene information, including scene type and/or weather conditions.

In some implementations, the computer (770) obtains additional information associated with the images (e.g., image 510) and the computer uses the additional information when applying the trained dynamics model 12 to the current crowd density map 512.

In some implementations, (772) the additional information includes one or more of: (i) a timestamp for the current image 510, (ii) one or more weather parameters associated with the current image 510, (iii) a day-of week indication for the current image 510, (iv) scene context annotations for each logical pixel 530 in the current image, (v) scene annotations for the current image, (vi) range information for the current image, and (vii) thermal information for the current image.

In some implementations, (780) the temporal sequence of images is captured by one or more of: (i) a static surveillance camera, (ii) a PTZ surveillance camera, (iii) a digital camera, (iv) an image sensor of a smartphone, (v) a drone camera, (vi) a vehicle mounted camera, or (vii) a rangefinder camera.

After a model has been trained, it can be used to make predictions. For example, in some implementations, a method of predicting future crowd density maps at physical venues, comprises: obtaining a trained model of crowd movement for a physical venue, trained according to a temporal sequence of images of the physical venue; obtaining a current image of the physical venue; subdividing the current image into a set of logical pixels according to a predetermined mapping used during the training of the model; for each logical pixel, computing a respective crowd density representing a respective number of mobile objects per unit of area in the physical venue at the logical pixel, thereby forming a crowd density map corresponding to the current image; receiving a specified future time offset from a time corresponding to the current image; and applying the trained model to the current crowd density map and the specified future time offset to predict a crowd density map at the physical venue at the specified future time offset.

In some implementations, the mobile objects are selected from the group consisting of: people, non-human animals, motorized vehicles, non-motorized vehicles, airplanes, drones, and mobile robots.

In some implementations, the physical venue is a portion of a park, an airport, a train station, an arena, a shopping mall, a factory, a home, a body of water, the sky, or a street corner.

In some implementations, each logical pixel corresponds to a respective single physical pixel in the images.

In some implementations, each logical pixel corresponds to a respective plurality of physical pixels in the images.

In some implementations the method further comprises obtaining additional information associated with the current image and using the additional information when applying the trained model to the current crowd density map. In some implementations, the additional information includes one or more of: (i) a timestamp for the current image; (ii) one or more weather parameters associated with the current image; (iii) a day-of-week indicator for the current image; (iv) scene context annotations for each logical pixel in the current image; (v) scene context annotations for the current image; (vi) range information for the current image; and (vii) thermal information for the current image.

In some implementations, computing the crowd density at each logical pixel comprises convolving the current image with one or more Gaussian maps.

In some implementations, computing the crowd density at each logical pixel comprises down-sampling.

In some implementations, the time deltas are between one millisecond and one week.

In some implementations, applying the trained model to the current crowd density map includes expressing the specified future time offset as an integer multiple N of $\Delta t$ and applying the trained model N times sequentially, starting with the current crowd density map.

In some implementations, applying the trained model provides a prediction of spatiotemporal changes in crowd density according to the current image and the specified future time offset. In some implementations, providing the predictions of spatiotemporal changes in crowd density is further according to scene information, including scene type and/or weather conditions.

In some implementations, applying the trained model also provides an accuracy estimate for the provided prediction.

In some implementations, the temporal sequence of images are captured by one or more of: (i) a static surveillance camera, (ii) a PTZ surveillance camera, (iii) a digital camera, (iv) an image sensor of a smartphone, (v) a drone camera, (vi) a vehicle mounted camera, or (vii) a rangefinder camera.

In some implementations, a time delta between successive images in the temporal sequence is consistent across the images.

In some implementations, a time delta between successive images in the temporal sequence is different across the images.

In accordance with some implementations, a computer system for modeling crowd movement at physical venues, comprises: one or more processors; memory; and one or more programs stored in the memory and configured for execution by the one or more processors, the one or more programs comprising instructions for: obtaining a trained model of crowd movement for a physical venue, trained according to a temporal sequence of images of the physical venue; obtaining a current image of the physical venue; subdividing the current image into a set of logical pixels according to a predetermined mapping used during the training of the model; for each logical pixel, computing a respective crowd density representing a respective number of mobile objects per unit of area in the physical venue at the logical pixel, thereby forming a crowd density map corresponding to the current image; receiving a specified future time offset from a time corresponding to the current image; and applying the trained model to the current crowd density map and the specified future time offset to predict a crowd density map at the physical venue at the specified future time offset.

In accordance with some implementations, a non-transitory computer readable storage medium stores one or more programs configured for execution by a computer system having one or more processors, memory, and a display, the one or more programs comprising instructions for: obtaining a trained model of crowd movement for a physical venue, trained according to a temporal sequence of images of the physical venue; obtaining a current image of the physical venue; subdividing the current image into a set of logical pixels according to a predetermined mapping used during the training of the model; for each logical pixel, computing a respective crowd density representing a respective number of mobile objects per unit of area in the physical venue at the logical pixel, thereby forming a crowd density map corresponding to the current image; receiving a specified future time offset from a time corresponding to the current image; and applying the trained model to the current crowd density map and the specified future time offset to predict a crowd density map at the physical venue at the specified future time offset.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of refactoring a flow diagram, comprising:
   at a computer system having one or more processors, memory storing one or more programs configured for execution by the one or more processors:
   obtaining a temporal sequence of images of a physical venue;
   for each of the images, subdividing the respective image into a respective set of logical pixels according to a predetermined mapping;
   for each logical pixel of each image, computing a respective crowd density representing a respective number of mobile objects per unit of area in the physical venue at the logical pixel, thereby forming a temporal sequence of crowd density maps corresponding to the temporal sequence of images; and
   using successive pairs of crowd density maps to train a model on spatiotemporal changes in crowd density at the physical venue.

2. The method of claim 1, wherein the mobile objects are selected from the group consisting of: people, non-human animals, motorized vehicles, non-motorized vehicles, airplanes, drones, and mobile robots.

3. The method of claim 1, wherein the physical venue is a portion of a park, an airport, a train station, an arena, a shopping mall, a factory, a home, a body of water, the sky, or a street corner.

4. The method of claim 1, wherein each logical pixel corresponds to a respective single physical pixel in the images.

5. The method of claim 1, wherein each logical pixel corresponds to a respective plurality of physical pixels in the images.

6. The method of claim 1, further comprising obtaining additional information associated with each of the images and using the additional information to train the model.

7. The method of claim 6, wherein the additional information includes one or more of: (i) a timestamp for each of the images; (ii) one or more weather parameters associated with each of the images; (iii) a day-of-week indicator for each of the images; (iv) scene context annotations for each logical pixel in each of the images; (v) scene context annotations for each of the images; (vi) range information; and (vii) thermal information.

8. The method of claim 1, wherein computing the crowd density at each logical pixel comprises convolving each of the each of the images with one or more Gaussian maps.

9. The method of claim 1, wherein computing the crowd density at each logical pixel comprises down-sampling.

10. The method of claim 1, wherein a time delta between successive images in the temporal sequence is a value Δt that is between one millisecond and one week.

11. The method of claim 1, wherein the trained model provides predictions of spatiotemporal changes in crowd density according to input images and requested time offsets from the input images.

12. The method of claim 11, wherein providing the predictions of spatiotemporal changes in crowd density is further according to scene information, including scene type and/or weather conditions.

13. The method of claim 11, wherein the trained model also provides accuracy estimates for the provided predictions.

14. The method of claim 1, wherein the temporal sequence of images comprises a plurality of temporal subsequences, wherein each of the successive pairs of crowd density maps used to train the model comprises a respective pair of crowd density maps within a single respective temporal subsequence.

15. The method of claim 1, wherein the temporal sequence of images are captured by one or more of: (i) a static surveillance camera, (ii) a PTZ surveillance camera, (iii) a digital camera, (iv) an image sensor of a smartphone, (v) a drone camera, (vi) a vehicle mounted camera, or (vii) a rangefinder camera.

16. The method of claim 1, wherein a time delta between successive images in the temporal sequence is consistent across the images.

17. The method of claim 1, wherein a time delta between successive images in the temporal sequence is different across the images.

18. A computer system for modeling crowd movement at physical venues, comprising:
   one or more processors;
   memory; and
   one or more programs stored in the memory and configured for execution by the one or more processors, the one or more programs comprising instructions for:
      obtaining a temporal sequence of images of a physical venue;
      for each of the images, subdividing the respective image into a respective set of logical pixels according to a predetermined mapping;
      for each logical pixel of each image, computing a respective crowd density representing a respective number of mobile objects per unit of area in the physical venue at the logical pixel, thereby forming a temporal sequence of crowd density maps corresponding to the temporal sequence of images; and
      using successive pairs of crowd density maps to train a model on spatiotemporal changes in crowd density at the physical venue.

19. The computer system of claim 18, wherein the trained model provides predictions of spatiotemporal changes in crowd density according to input images and requested time offsets from the input images.

20. A non-transitory computer readable storage medium storing one or more programs configured for execution by a computer system having one or more processors, memory, and a display, the one or more programs comprising instructions for:
   obtaining a temporal sequence of images of a physical venue;
   for each of the images, subdividing the respective image into a respective set of logical pixels according to a predetermined mapping;
   for each logical pixel of each image, computing a respective crowd density representing a respective number of mobile objects per unit of area in the physical venue at the logical pixel, thereby forming a temporal sequence of crowd density maps corresponding to the temporal sequence of images; and
   using successive pairs of crowd density maps to train a model on spatiotemporal changes in crowd density at the physical venue.

* * * * *